US011543300B2

(12) United States Patent
Aguilar et al.

(10) Patent No.: US 11,543,300 B2
(45) Date of Patent: Jan. 3, 2023

(54) DYNAMIC TEMPERATURE COMPENSATION OF A THERMOSTAT FOR AN EVAPORATIVE COOLER SYSTEM

(71) Applicant: Ademco Inc., Golden Valley, MN (US)

(72) Inventors: Rafael Aguilar, Chihuahua (MX); Ricardo Cano, Chihuahua (MX); Ever Hernandez, Chihuahua (MX); Ricardo Gonzalez, Chihuahua (MX)

(73) Assignee: Ademco Inc., Golden Valley, MN (US)

( * ) Notice: Subject to any disclaimer, the term of this patent is extended or adjusted under 35 U.S.C. 154(b) by 456 days.

(21) Appl. No.: 16/669,330

(22) Filed: Oct. 30, 2019

(65) Prior Publication Data
US 2020/0132554 A1    Apr. 30, 2020

Related U.S. Application Data

(60) Provisional application No. 62/752,773, filed on Oct. 30, 2018.

(51) Int. Cl.
*G01K 3/14*    (2006.01)
*F24H 9/20*    (2022.01)
(Continued)

(52) U.S. Cl.
CPC .............. *G01K 3/14* (2013.01); *F24F 5/0035* (2013.01); *F24F 11/0001* (2013.01);
(Continued)

(58) Field of Classification Search
CPC .. G01K 3/14; G01K 7/42; G01K 7/427; F24F 5/0035; F24F 11/0001; F24F 11/30; F24F 11/70; F24H 9/2071
See application file for complete search history.

(56) References Cited

U.S. PATENT DOCUMENTS 4,315,413 A * 2/1982 Baker ................... G01K 15/00
374/170
4,741,476 A    5/1988 Russo et al.
(Continued)

FOREIGN PATENT DOCUMENTS

| CN | 103868610 B | 2/2017 |
|---|---|---|
| EP | 3324164 A1 | 5/2018 |
| JP | 2017053677 A | 3/2017 |

OTHER PUBLICATIONS

U.S. Appl. No. 16/047,344, filed Jul. 27, 2018, naming inventors Ponce et al.
(Continued)

*Primary Examiner* — Nathaniel T Woodward
*Assistant Examiner* — Philip L Cotey
(74) *Attorney, Agent, or Firm* — Greenberg Traurig, LLP; David J. Dykeman; Ryan D. Sharp

(57) ABSTRACT

The disclosure is directed to techniques for a thermostat to determine the air temperature of a room based on measurements of temperatures sensors located inside a housing of the thermostat. Because the thermostat for an evaporative cooler operates at line voltage and controls current flowing to the evaporative cooler, the magnitude of current flowing through the thermostat may vary from nearly zero, when the thermostat is in the powered-off state, to a current on the order of several amps. The variation in current causes a variation in temperature inside the housing of the thermostat. The techniques of this disclosure compensate for changes the internal housing temperature caused by changes in operating mode. The compensation allows the temperature sensors inside the thermostat housing to determine the air temperature of the room in which the thermostat is located, without regard for the operating mode of the evaporative cooler system.

20 Claims, 14 Drawing Sheets

(51) Int. Cl.
   *F24F 11/30* (2018.01)
   *G01K 7/42* (2006.01)
   *F24F 5/00* (2006.01)
   *F24F 11/70* (2018.01)
   *F24F 11/00* (2018.01)

(52) U.S. Cl.
   CPC .............. *F24F 11/30* (2018.01); *F24F 11/70* (2018.01); *F24H 9/2071* (2013.01); *G01K 7/42* (2013.01); *G01K 7/427* (2013.01)

(56) References Cited

U.S. PATENT DOCUMENTS

| | | | | |
|---|---|---|---|---|
| 5,199,637 | A * | 4/1993 | Adams | G05D 23/1917 361/140 |
| 5,303,561 | A * | 4/1994 | Bahel | G05D 27/02 62/186 |
| 8,280,673 | B2 * | 10/2012 | Aljabari | H05B 1/02 702/130 |
| 9,335,769 | B2 * | 5/2016 | Aljabari | F24F 11/62 |
| 9,784,624 | B2 * | 10/2017 | Niederberger | H04M 1/21 |
| 9,797,619 | B2 * | 10/2017 | Aljabari | H05K 13/00 |
| 10,209,688 | B2 * | 2/2019 | Stefanski | G05D 23/193 |
| 10,222,271 | B2 * | 3/2019 | Aljabari | G01K 1/00 |
| 2002/0033252 | A1 * | 3/2002 | Sasao | F24F 11/30 165/238 |
| 2005/0183430 | A1 * | 8/2005 | McMillan | F24F 5/0035 62/304 |
| 2011/0289951 | A1 * | 12/2011 | Furlong | F28C 1/00 29/890.035 |
| 2013/0099008 | A1 * | 4/2013 | Aljabari | G05D 23/1917 236/1 C |
| 2014/0277770 | A1 * | 9/2014 | Aljabari | H05K 13/00 700/278 |
| 2014/0328368 | A1 * | 11/2014 | Niederberger | G01K 7/427 374/1 |
| 2015/0102114 | A1 * | 4/2015 | McFarland | F24F 11/30 236/44 A |
| 2016/0231755 | A1 * | 8/2016 | Ajax | F24F 11/30 |
| 2016/0349823 | A1 | 12/2016 | Killo et al. | |
| 2016/0377309 | A1 * | 12/2016 | Abiprojo | G01K 15/00 374/170 |
| 2017/0059190 | A1 | 3/2017 | Stefanski et al. | |
| 2019/0109443 | A1 | 4/2019 | Bhate et al. | |
| 2019/0178511 | A1 * | 6/2019 | Zimmerman | F24F 11/30 |
| 2019/0178521 | A1 * | 6/2019 | Zimmerman | G05D 23/1931 |
| 2020/0036304 | A1 | 1/2020 | Ponce et al. | |
| 2020/0132554 | A1 | 4/2020 | Aguilar et al. | |

OTHER PUBLICATIONS

Skymind, "A.I. Wiki," accessed from https://skymind.ai/wiki/neural-network#concrete retrieved on Oct. 30, 2019, 12 pp.
U.S. Appl. No. 16/935,107, filed Jul. 21, 2020, by Martinez et al.

* cited by examiner

FIG. 4 Curves of different operation modes

DYNAMIC TEMPERATURE COMPENSATION OF A THERMOSTAT FOR AN EVAPORATIVE COOLER SYSTEM

This application claims the benefit of U.S. Provisional Patent Application No. 62/752,773, filed Oct. 30, 2018, the entire content of which is incorporated herein by reference.

TECHNICAL FIELD

The disclosure relates to a thermostat for an evaporative cooler system.

BACKGROUND

An evaporative cooler may be used to increase the humidity and reduce the temperature of the air inside a space in building. Evaporative coolers may be advantageous in arid regions where the air outside the building has low humidity. Some examples of evaporative coolers may include a thermostat as part of a cooler system. The thermostat may control various operational states of an evaporative cooler, including whether the evaporative cooler is turned on or off.

SUMMARY

In general, the disclosure is directed to techniques to determine, by a thermostat, the air temperature of a room based on measurements of temperature sensors located inside a housing of the thermostat. Because the thermostat for an evaporative cooler operates at line voltage and controls current flowing to the evaporative cooler, the magnitude of current flowing through the thermostat may vary from zero, when the thermostat is in the powered-off state, to a current on the order of several amps. The variation in current causes a variation in temperature inside the housing of the thermostat. The techniques of this disclosure compensate for changes to the internal housing temperature caused by changes in operating mode. The compensation allows the temperature sensors inside the thermostat housing to determine the air temperature of the room in which the thermostat is located, without regard for the mode of the evaporative cooler system.

In one example, the disclosure is directed to a method that includes determining a temperature inside a housing at a first time based on a signal from a sensor, wherein the housing is a line voltage thermostat housing, and determining an operating mode for the thermostat; determining a charge level of a load controlled by the thermostat; determining a dynamic factor based on: the determined temperature inside the housing, the operating mode, and the charge level. The method includes applying the dynamic factor to the determined temperature inside the housing to determine an ambient temperature at the first time, wherein the ambient temperature is a temperature exterior to the housing.

In another example, the disclosure is directed to a device that includes a housing; a first temperature sensor located within the housing; processing circuitry located within the housing and configured to: receive signals from the first temperature sensor indicating a temperature within the housing; receive an indication of an operating mode for the device; determine a charge level of a load controlled by the thermostat; determine a dynamic factor based on: the determined temperature inside the housing, the operating mode, and the charge level; and apply the dynamic factor to the determined temperature inside the housing to determine an ambient temperature, wherein the ambient temperature is a temperature exterior to the housing.

In another example, the disclosure is directed to system that includes an evaporative cooler device, comprising: a water pump; and a multi-speed blower motor; and a thermostat device, the thermostat device comprising: a housing; a first temperature sensor located within the housing; processing circuitry located within the housing and configured to: receive signals from the first temperature sensor indicating a temperature within the housing; receive an indication of an operating mode for the device, wherein the operating mode determines a speed setting for the multi-speed blower motor and determines an on-off setting for the water pump; determine a charge level of a load controlled by the thermostat, wherein the load comprises the water pump and the blower motor; determine a dynamic factor based on: the determined temperature inside the housing, the operating mode, and the charge level; and apply the dynamic factor to the determined temperature inside the housing to determine an ambient temperature, wherein the ambient temperature is a temperature exterior to the housing, The details of one or more examples of the disclosure are set forth in the accompanying drawings and the description below. Other features, objects, and advantages of the disclosure will be apparent from the description and drawings, and from the claims.

DETAILED DESCRIPTION

The evaporative cooling system of this disclosure includes an evaporative cooler controlled by a thermostat. Because a thermostat for an evaporative cooler may operate at line voltage and may control the current flowing to the evaporative cooler, the magnitude of current flowing through the thermostat may vary from zero, when the thermostat is in the OFF state, to a current on the order of several amps when a blower motor and water pump for the evaporative cooler are both running. The variation in current causes a variation in temperature inside the housing of the thermostat. The techniques of this disclosure compensate for changes to the internal housing temperature caused by changes in operating mode. The compensation allows the temperature sensors inside the thermostat housing to determine the air temperature of the room in which the thermostat is located, without regard for the mode of the evaporative cooler system.

The compensation function executed by processing circuitry of the thermostat determines the expected temperature rise of a circuit board inside the thermostat housing on which may be mounted one or more relays and the one or more temperature sensors. Processing circuitry within the thermostat may subtract the expected temperature rise of the circuit board (which may be referred to as simply the "board" in this disclosure) caused by the operating mode, from the total temperature measured by the temperature sensors. In this manner the thermostat may determine the air temperature of a room based on measurements of temperatures sensors located inside a housing of the thermostat.

Figure 1A:
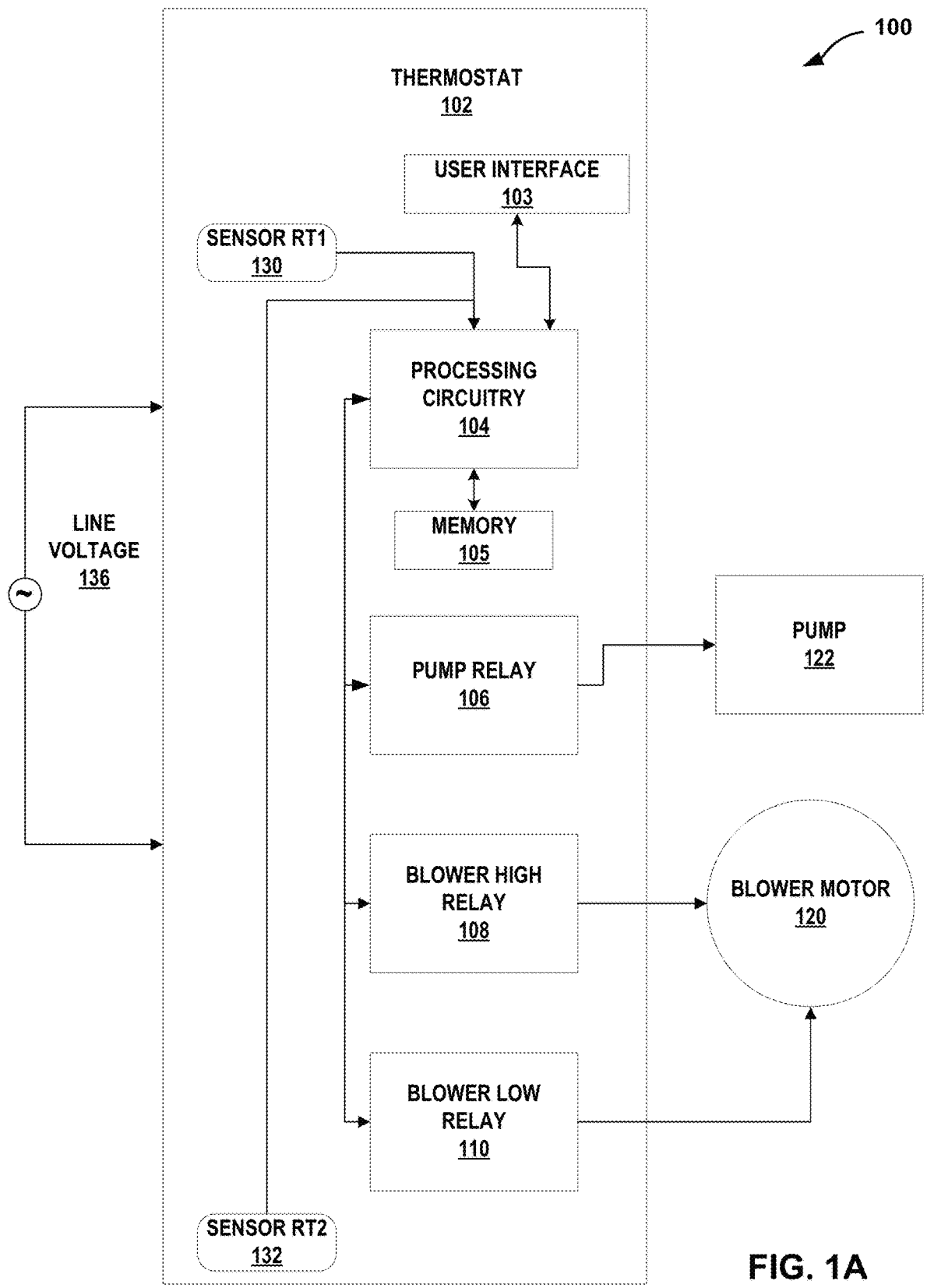
FIG. 1A is a block diagram illustrating an evaporative cooling system according to one or more techniques of this disclosure.

FIG. 1A is a block diagram illustrating an evaporative cooling system according to one or more techniques of this disclosure. System 100 illustrates a line voltage thermostat 102 controlling blower motor 120 and pump 122 of an evaporative cooler (not shown in FIG. 1A). An evaporative cooler and an evaporative cooler system may also be referred to as an evaporative cooling system in this disclosure.

In the example of system 100, thermostat 102 includes processing circuitry 104, which may receive signals from sensor RT1 130 and RT2 132 as well as from user interface 103. Processing circuitry 104 may store and retrieve data from memory 105. Processing circuitry 104 may also send control signals to pump relay 106, blower high relay 108 and blower low relay 110. In some examples, processing circuitry 104 may also receive signals from pump relay 106, blower high relay 108 and blower low relay 110, or from circuit board components coupled to pump relay 106, blower high relay 108 and blower low relay 110 that provide status information for pump relay 106, blower high relay 108 and blower low relay 110, e.g. relay open, relay closed, and so on. In some examples the components of thermostat 102 may be mounted to one or more circuit boards.

Some examples of processing circuitry 104 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "computer," "processing circuitry," "processor" or "controller," as used herein, may refer to any one or more of the foregoing structures or any other structure operable to perform techniques described herein.

Examples of memory 105 may include RAM, ROM, EEPROM, other magnetic storage devices, flash memory, or any other medium that can be used to store desired program code in the form of instructions or data structures and that can be accessed by a computer. Memory 105 may store measured values over time, may include instructions that may be executed by one or more processors, and may act as temporary data storage. In some examples memory 105 may be integrated with processing circuitry 104, such as with an MCU or SoC. In other examples, memory 105 may be a separate component operatively coupled to processing circuitry 104.

User interface 103 may include one or more controls (not shown in FIG. 1A) configured to receive input from a user, such as to select a desired temperature or operating mode for the evaporative cooler. User interface 103 may also include one or more displays (not shown in FIG. 1A) such as a display screen, indicator lights and similar displays, which may indicate the set temperature, measured room temperature, operating mode and other items.

In the example of FIG. 1A, sensors RT1 130 and RT2 132 are temperature sensors. However, in other examples, other sensors may be included as part of thermostat 102, such as humidity sensor, presence sensor, and other types of sensors. In the example of FIG. 1A, sensor RT1 130 may be considered the "hot" sensor and be placed in an area of thermostat 102 that may be subject to higher temperatures when compared to the location of sensor RT2 132. For example, sensor RT1 130 may be placed near blower high relay 108 and blower low relay 110, which may be subject to increased temperature as current flows through blower high relay 108 and blower low relay 110. Sensor RT2 132 may be placed in a more isolated location on a circuit board of thermostat 102, or in a location with low voltage components that are less likely to increase in temperature. To determine the charge level, a relation between the two thermistors, e.g. between sensor RT1 130 and RT2 132 may be determined by processing circuitry 104.

The charge, or charge level, of system 100 means the power required to operate the system, e.g. the power consumption of the system. For example, a large building may require a large blower motor 120 while a small building or room may require a smaller blower motor 120. In some examples, a larger pump 122 may be used for a larger capacity evaporative cooler used in a larger building. The current is associated to the charge. There is a relation between the difference of the cool (sensor RT2 132) and hot (sensor RT1 130) thermistors readings and the charge. The more charge of the system, the more internal heating. The difference between the temperatures sensed by the cool and hot thermistors increases with the charge. This difference is stable and unique for each load when the characteristic curves have arrived at steady state for a selected operating mode.

Thermostat 102 may receive line voltage 136 and couple line voltage to pump 122 and blower motor 120 via pump relay 106, blower high relay 108 and blower low relay 110. Though described as "relay" in the example of FIG. 1A, pump relay 106, blower high relay 108 and blower low relay 110 may be any type of switch that may receive control signals from processing circuitry 104 and control the current flowing to pump 122 and blower motor 120. In other examples, pump relay 106, blower high relay 108 and blower low relay 110 may be implemented as an electronic switch such as an insulated gate bipolar transistor (IGBT) or other power switch.

In operation, a user may decide whether the user wants the air temperature inside the building reduced (when pump is turned on) or not. They also can decide the amount of fresh air by selecting low or high velocity of the motor. For high external temperature (e.g. outside the building), the user may select an operating mode with the pump turned on and a high motor velocity.

Evaporative cooler systems do not have the power of a refrigeration system, such as a refrigerant based heating, ventilation and air conditioning (HVAC) system. Evaporative cooler system 100 may not be able to drop the house temperature to reach a specified cold ambient room temperature. Instead, evaporative cooling system 100 may have to keep working continuously during to maintain a temperature inside the building that is less than the external temperature. For example, to maintain an internal room ambient temperature of approximately 25° C.-27° C. (77-80° F.) when the external temperature is higher, such as 35° C. (95° F.). So evaporative cooler thermostats do not work as conventional HVAC thermostats, which turn on and off the controlled air conditioning equipment to maintain a tiny temperature band by using an advanced control algorithm.

Unlike HVAC thermostats, accurate control is not the purpose of the evaporative cooler thermostat, such as thermostat 102. Even having an automatic control mode, the control algorithm of system 100 may only be able to keep the temperature within a broad band of approximately 5° C. (8° F.) using an ON/OFF control. However, due to the lack of cooling power, when compared to an air conditioning unit of an HVAC system, an automatic control mode is not the main mode of thermostat 102. In some examples, users would prefer to program the number of hours that the system will be running continuously before being automatically turned off, for example, during the night when the external temperature may be reduced. Users also may prefer to program the on/off schedule during the whole week. For example, OFF periods may be desired during last stage of the night when the external temperature have dropped. These characteristics of system 100 are considerations for the temperature compensation issues described by this disclosure.

The evaporative cooler thermostat of this disclosure, e.g. thermostat 102, is a controller that has connected to its terminals water pump 122 and blower motor 120. In the example of FIG. 1A, blower motor 120 may work in two speeds (high and low velocity) and with or without water pump 122. In other examples, blower motor 120 may operate with a single speed, or with three or more speeds, with or without pump 122. For the example of system 100, the operation modes are listed in the following table:

TABLE 1

Full Operating Modes of System 100.

| Operation Mode (OM) | Description | Components |
|---|---|---|
| OFF (1) | In this mode, the thermostat does nothing, only shows the display | |
| PUMP ONLY (2) | Used when the pump is turned on | Pump 122 |
| LOW COOL (3) | Used when the motor is turned on along with the pump in low velocity of the motor | Pump 122 Blower Low Relay 110 |
| LOW VENT (4) | Used when the motor is turned on without the pump in low velocity of the motor | Blower Low Relay 110 |
| HIGH COOL (5) | Used when the motor is turned on along with the pump in high velocity of the motor | Pump 122 Blower high Relay 108 |
| HIGH VENT (6) | Used when the motor is turned on without the pump in high velocity of the motor | Blower high Relay 108 |

Other considerations include that both sensor RT1 130 and RT2 132 are mounted completely inside the housing of thermostat 102, and not in contact with the ambient room air. Therefore, sensors RT1 130 and RT2 132 are more susceptible to changes in operating mode, and current through thermostat 102, than other examples of thermostats for evaporative coolers which may include one or more sensors mounted outside of the thermostat housing. In other words, When the current starts flowing through the relays and the board, the temperature inside the housing of thermostat 102 may quickly increase. When the current is interrupted the temperature may decrease.

In some examples, the housing of thermostat 102 may include no grilles or other openings to allow ambient room air to flow through the housing and around the components of thermostat 102, such as the board and sensors RT1 130 and RT2 132. For example, for manufacturing reasons, the housing of thermostat 102 may be made from a softer, more flexible plastic that is not as compatible with grilles or other openings when compared to a housing made with harder plastic that may include grilles molded into the housing. The lack of grilles or similar openings to the ambient room air may result in thermal inertia for thermostat 102.

Additionally, internal sensors such as RT1 130 and RT2 132 may "feel" a difference according to the size of the blower motor 120 when compared to a thermostat with an outer sensor. For example, a one horsepower (1 HP) motor load may produce a higher temperature for the same operating mode than a one-third HP (⅓ HP) motor. An external sensor may not feel such a difference in charge level, therefore only some few degrees may need be compensated for a thermostat with a sensor external to the housing and placed in the ambient room air.

The techniques of this disclosure determine a dynamic factor to compensate the temperature measurements for one or more temperature sensors internal to the housing of thermostat 102 and without grilles. The dynamic factor is subtracted from the temperature measurement of the cool thermistor (e.g. RT2 132) and processing circuitry 104 estimates and displays the ambient room temperature and controls the evaporative cooler based on the compensated temperature.

Figure 1B:
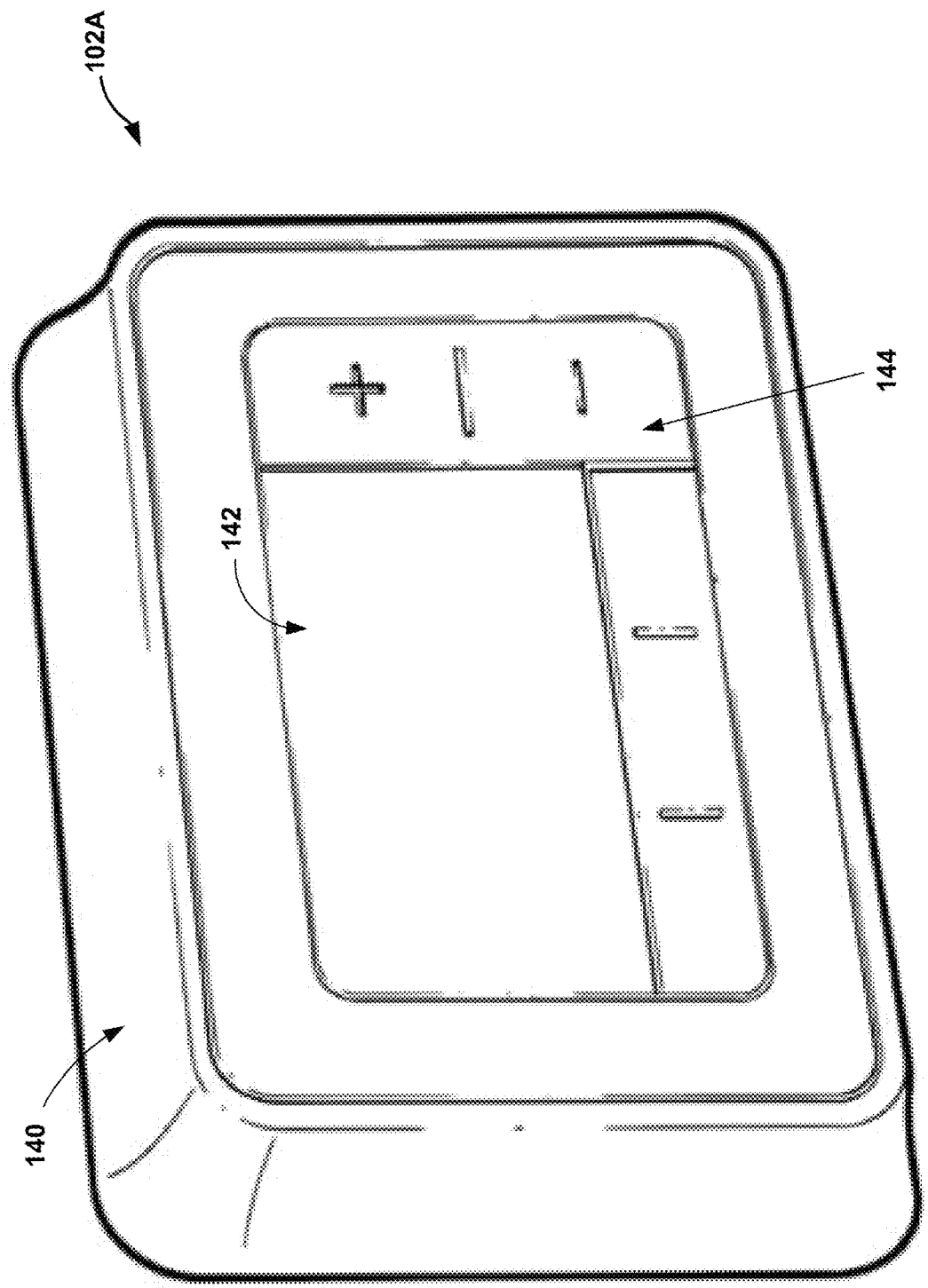
FIG. 1B is a conceptual diagram illustrating an example line voltage thermostat for an evaporative cooling system according to one or more techniques of this disclosure.

FIG. 1B is a conceptual diagram illustrating an example line voltage thermostat for evaporative cooling system according to one or more techniques of this disclosure.

Thermostat 102A is an example of thermostat 102 described above in relation to FIG. 1A. Thermostat 102A may include a case 140, one or more displays 142 and one or more controls 144 for user input to thermostat 102A. Case 140 may also be referred to as housing 140 in this disclosure.

Controls 144 may allow a user to change a desired temperature setting, change what is displayed in displays 142, select an operating mode, and perform other functions. Though shown as a single screen in FIG. 1B, displays 142 may include additional screens, indicator lights and similar displays. In some examples, thermostat 102A may include a speaker or similar sound generating device (not shown in FIG. 1B) to provide alerts, confirmation tones, or other audio signals to a user.

The main information available to the processing circuitry of thermostat 102A (not shown in FIG. 1B) is the signals from the sensors that measure the temperature completely inside the case 140 of thermostat 102A. Sensors, such as sensors 130 and 132 are located on cool and hot region of the board as described above in relation to FIG. 1A.

To reduce costs, improve manufacturing yield and reduce overhead and inventory, thermostat 102A may be produced using the infrastructure already developed for other types of thermostats manufactured at the same locations, such as low voltage thermostats, without making any complex adaptation on the manufacturing process. Low voltage thermostats may also locate the sensors inside the case, and the sensors are not in contact with ambient room air external to case 140. Also, the plastic and other material may be the same used to produce low voltage thermostats. For example, the use of grilles in case 140 may require the use of a harder, less flexible plastic than the plastic that may be used for low voltage thermostats. Therefore, though grilles may be desirable, for increasing heat dissipation, the use of grilles may require different processes, increased inventory and increase cost. In some examples, grilles may make thermostat less attractive for some customers.

Figure 2:
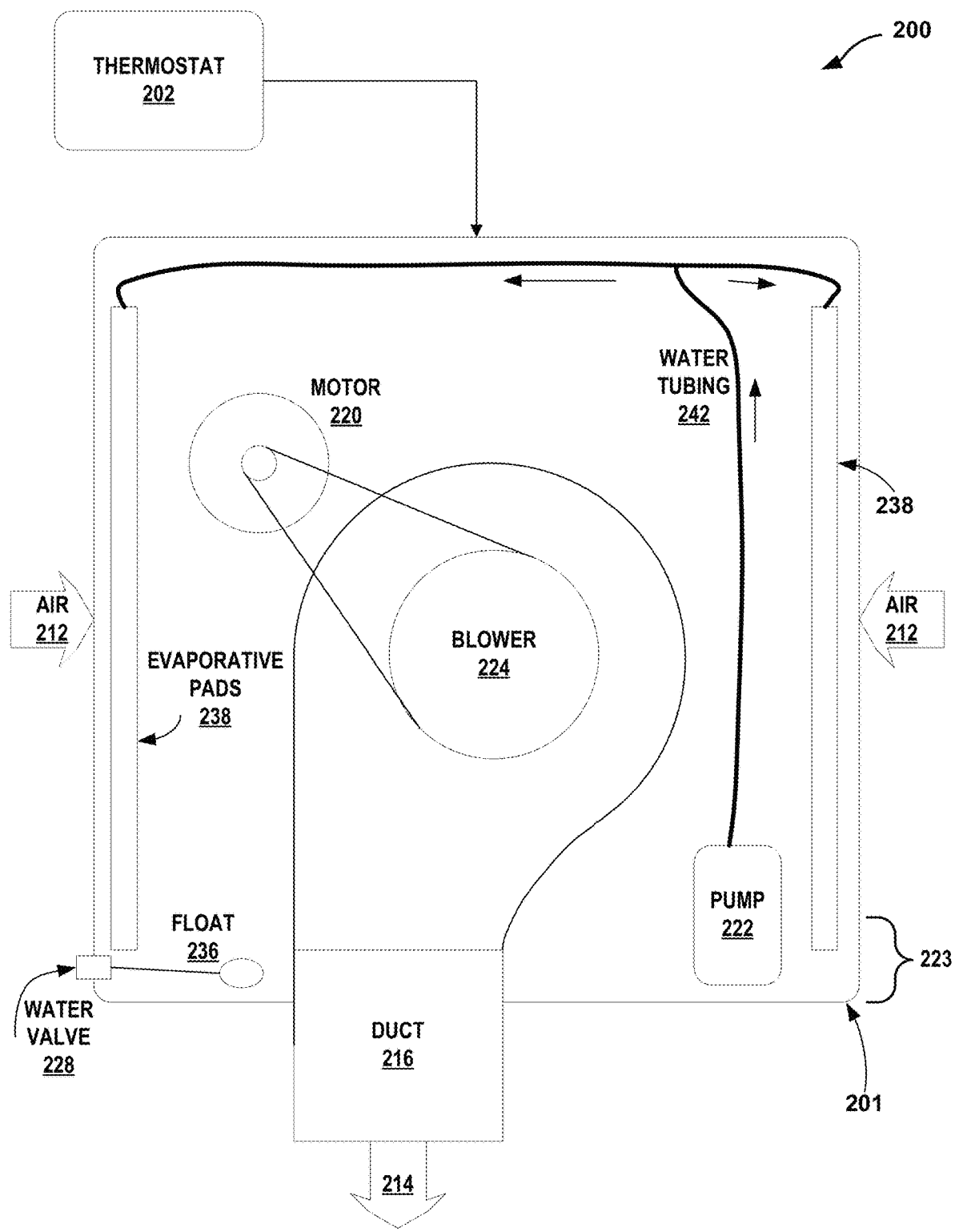
FIG. 2 is a block diagram illustrating an evaporative cooling system including the evaporative cooler, according to one or more techniques of this disclosure.

FIG. 2 is a block diagram illustrating an example evaporative cooling system including the evaporative cooler, according to one or more techniques of this disclosure. Thermostat 202, blower motor 220 and pump 222 are respectively examples of thermostat 102, blower motor 120 and pump 122 described above in relation to FIG. 1A and have the same functions and characteristics as thermostat 102, blower motor 120 and pump 122.

Evaporative cooler 201 may be located on outside a building on a roof, a window or similar location of a building and cools one or more rooms of the building by sending conditioned air 214 through duct 216 into the building. In the example of system 200, the elements of the evaporative cooler 201 are as follows: two speed motor 220, blower 224, water pump 222, one or more porous casings 238, ducts 216 connecting the output of blower 224 with the interior of the house, an exterior casing of which the bottom portion forms water container 223, and in some examples water valve 228 controlled by float 236.

Motor 220, blower 224, pump 222 and water container 223 are located inside the casing of evaporative cooler 201. Pump 222 elevates the water from water container 223 through water tubing 242 to the upper zone of the case. By means of gravity the water is returned to the container passing through the porous media (not shown in FIG. 2) of porous casing 238. In some examples the porous media may be composed of natural or artificial material such as straw. Water is distributed across the top of the porous media of casings 238 and flows down back into water container 223, wetting the porous media. Though shown on two sides of evaporative cooler 201, in other examples casings 238 may be on three or more sides of evaporative cooler 201.

When 220 motor drives blower 224, the external hot dry air 212 passes across the straw, or other porous media, in perpendicular direction to the flow of water. In this manner, the water is in contact with hot dry air 212 that is entering in the casing and some of the water is evaporated. The latent heat which is necessary to evaporate the water comes from hot dry air 212. So, there is an energy interchange, the heat gained by the water comes from the air. The air that passes through the wet porous media of casings 238 loses energy. The temperature of the air is reduced, and the air is also humidified. This conditioned air 214 is sent to the house through ducts 216. When pump 222 is turned off, and the porous media in casings 238 is dry, then the air 214 that enters into the house is at the same temperature as the external air 212. In some examples, motor 220 may operate at one or more speeds, such as the HIGH velocity and LOW velocity, or OFF described above in relation to FIG. 1A.

Figure 3:
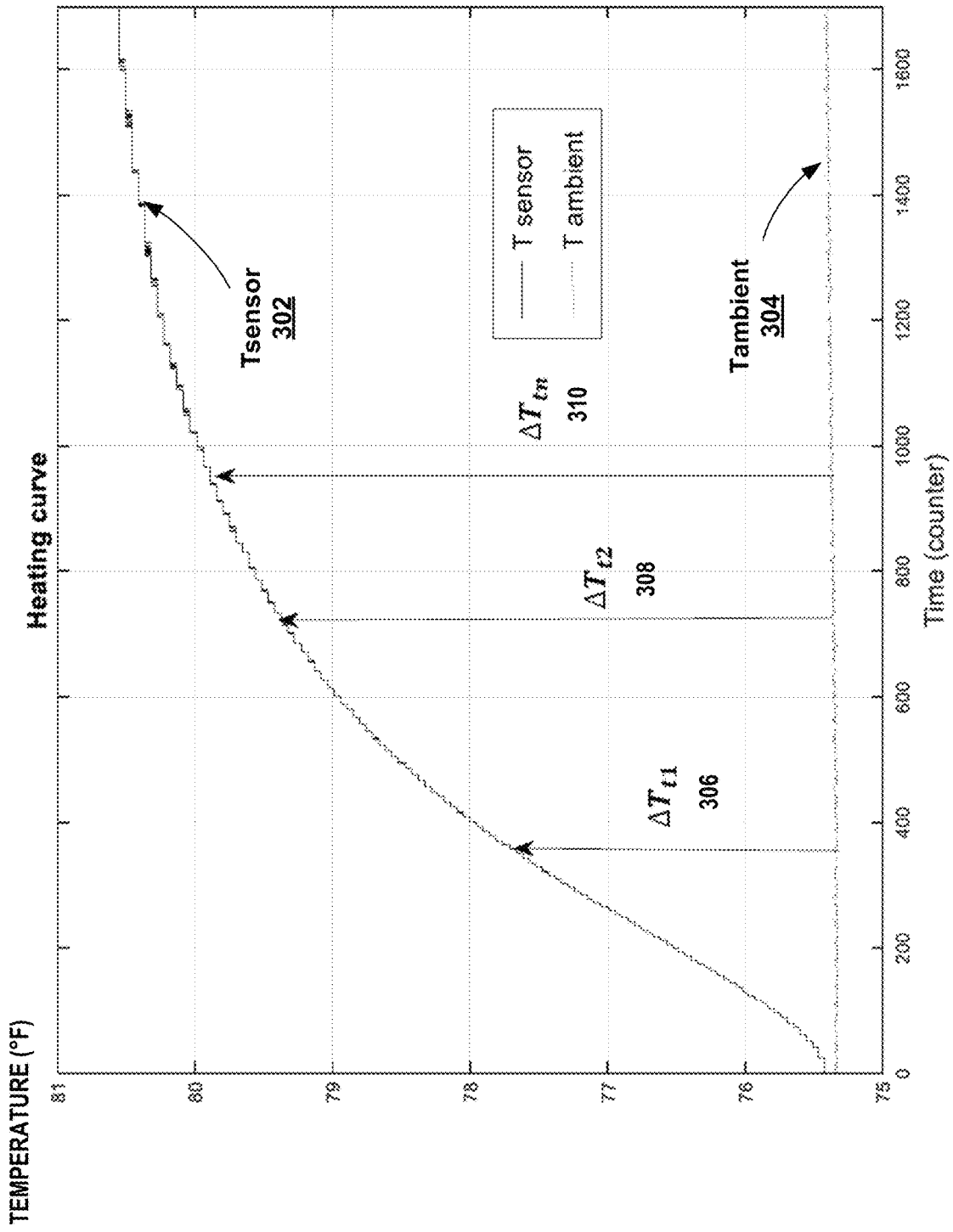
FIG. 3 is a time graph illustrating a characteristic heating curve measured by a temperature sensor in a thermostat of this disclosure.

FIG. 3 is a time graph illustrating a characteristic heating curve measured by a temperature sensor in a thermostat of this disclosure. When a line voltage thermostat, such as thermostat 102 described above in relation to FIG. 1A, is turned on by plugging in or otherwise applying power, any of the temperature sensors may behave as shown by Tsensor 302 in FIG. 3.

At the beginning (i.e. counter=zero), before applying power to the thermostat, the sensor and the ambient temperature are at thermal equilibrium. Therefore, Tsensor 302 is approximately equal to Tambient 304. In some examples time is represented by a counter, which may be incremented by a predetermined duration. For example, each count may be one second long, five seconds long or some other duration.

In the example of FIG. 3, the temperature, Tsensor 302, measured by, for example cool sensor RT2 132 described above in relation to FIG. 1A, increases above Tambient 304 over time until reaching a steady state. The change in temperature $\Delta T$ may be described by the following equation $$\Delta T = T\text{sensor} - T\text{ambient}$$

The dynamic factor $\Delta T$ is a function of time (e.g. $\Delta T = f(t)$). The temperature compensation techniques for the thermostat of this disclosure may include subtracting the dynamic factor $\Delta T$ from the value measured by the temperature sensor, e.g.:

$$T\text{comp} = T\text{sensor} - \Delta T$$

The dynamic factor may also be referred to as a temperature compensation factor in this disclosure.

Figure 4:
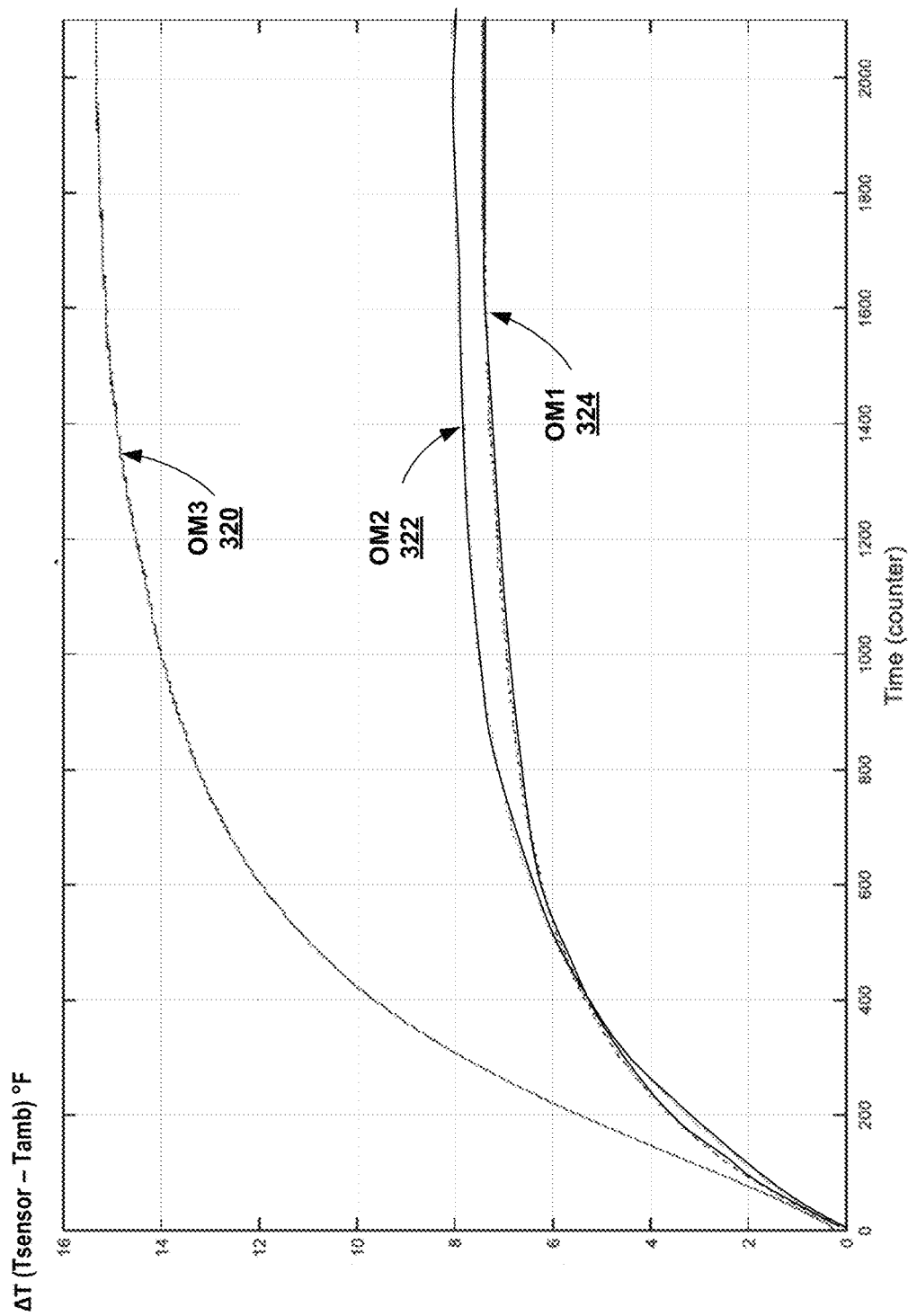
FIG. 4 is a time graph illustrating a characteristic heating curve for different operation modes as measured by a temperature sensor in a thermostat of this disclosure.

FIG. 4 is a time graph illustrating a characteristic heating curve for different operation modes as measured by a temperature sensor in a thermostat of this disclosure. The heating curves of FIG. 4 are examples of the heating curve described above in relation to FIG. 3.

The example of FIG. 4 shows the curves of temperatures according to a selected operation mode for a certain motor and blower. The operation mode three (OM3 320) heats the internal circuit board of the line voltage thermostat more than OM1 324 because the increased current flow through the thermostat relays caused by the motor RPM at HIGH fan speed compared to the OM1 324 condition with no motor current. The example of FIG. 4 shows that that the dynamic factor is also a function of the operation mode in addition to a function of time. That is: $\Delta T = f(t, OM)$. In this disclosure the different operating modes may be referred to as OM1, OM2 and so on. The different operating modes may also be referred to as OM=1, OM=2 and so on. The operating mode OM1 is equivalent to OM=1.

In some examples, two operation modes may have similar thermal behavior, and therefore the characteristic curves may be similar. For example, referring to Table 1 described above in relation to FIG. 1, the characteristic curve for Pump Only (OM=2) may be similar to the OFF mode (OM=1) in which the thermostat is powered on, but the evaporative cooler is OFF. In other words, in OFF mode, none of the components of the evaporative cooler receive power through the thermostat.

Similarly, LOW COOL (OM=3) may have a similar curve to LOW VENT (OM=4) and HIGH COOL (OM=5) may have a similar curve to HIGH VENT (OM=6). This means that the six operating modes can be reduced to three to simplify thermostat operation. In some examples, the characteristic curve for OM5 may be close but not equal to the characteristic curve for OM6. However, for the example thermostat of this disclosure, OM5 and OM6 will be considered equal for simplification. When in OM1, the thermostat may display information in the user interface, and draw a small amount of current, even if the PUMP is not running.

TABLE 2

Reduced Operation Modes

| Operation Mode (OM) | Description |
| --- | --- |
| 1 (324) | OFF and PUMP |
| 2 (322) | Motor and pump or just motor in low velocity |
| 3 (320) | Motor and pump or just motor in high velocity |

Figure 5:
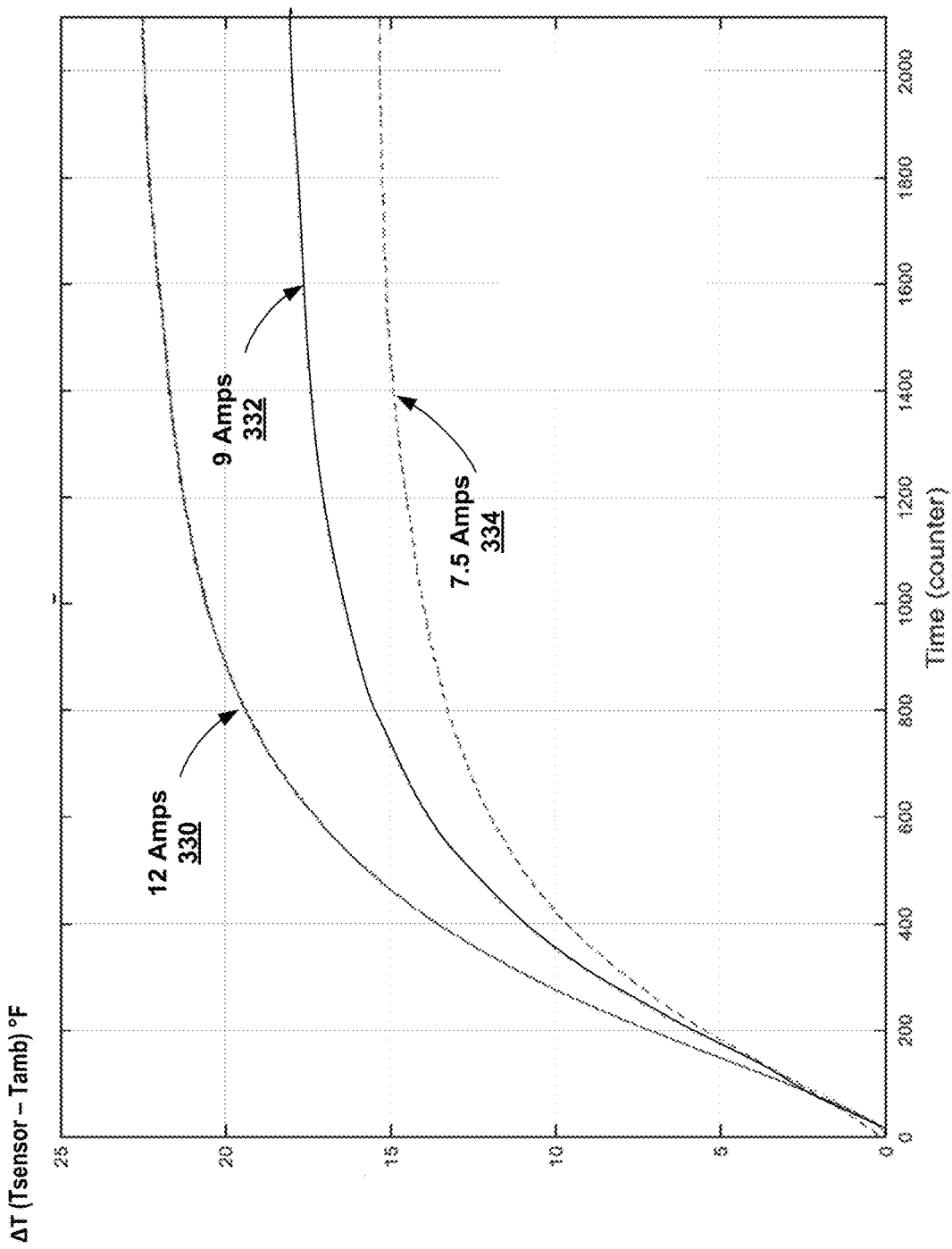
FIG. 5 is a time graph illustrating a characteristic heating curve for different motor loads as measured by a temperature sensor in a thermostat of this disclosure.

FIG. 5 is a time graph illustrating a characteristic heating curve for different motor loads as measured by a temperature sensor in a thermostat of this disclosure. As described above in relation to FIG. 1A, the charge, or charge level, of an evaporative cooler system means the power required to operate the system. A large building may require a large blower motor while a small building or room may require a smaller blower motor. The charge or charge level of the system is related to the load of the motor and pump of the evaporative cooler, and the current through the relays of the thermostat circuit board is related to the charge. In other words, the charge level is based in part on power consumption by the motor during operation of the motor.

The current through the relay may depend on the charge/load, which is related to the size of the motor and the motor velocity. When the motor is in high RPM operation, the current through the thermostat depends on the specific capacity needed to cool each house or room. For a higher charge and a bigger motor, the current and the temperature measured by the internal sensors of the thermostat typically increase.

As shown in FIG. 5, a twelve amp (330) motor may cause a larger increase in $\Delta T$ as the time counter increases when compared to a nine amp (332) motor. Similarly, both the twelve amp (330) motor and the nine amp (332) motor may cause a larger increase in $\Delta T$ as the time counter increases when compared to a 7.5 amp (334) motor.

There is a relation between the difference of the cool and hot thermistors readings, e.g. by sensor RT2 132 and sensor RT1 130 described above in relation to FIG. 1, and the charge. The more charge of the system, the more internal heating. The difference between the temperatures sensed by the cool and hot thermistors increases with the charge. This difference is stable and unique for each load, e.g. twelve amp (330) motor, when the characteristic curves have arrived at steady state for a selected operating mode.

Figure 6:
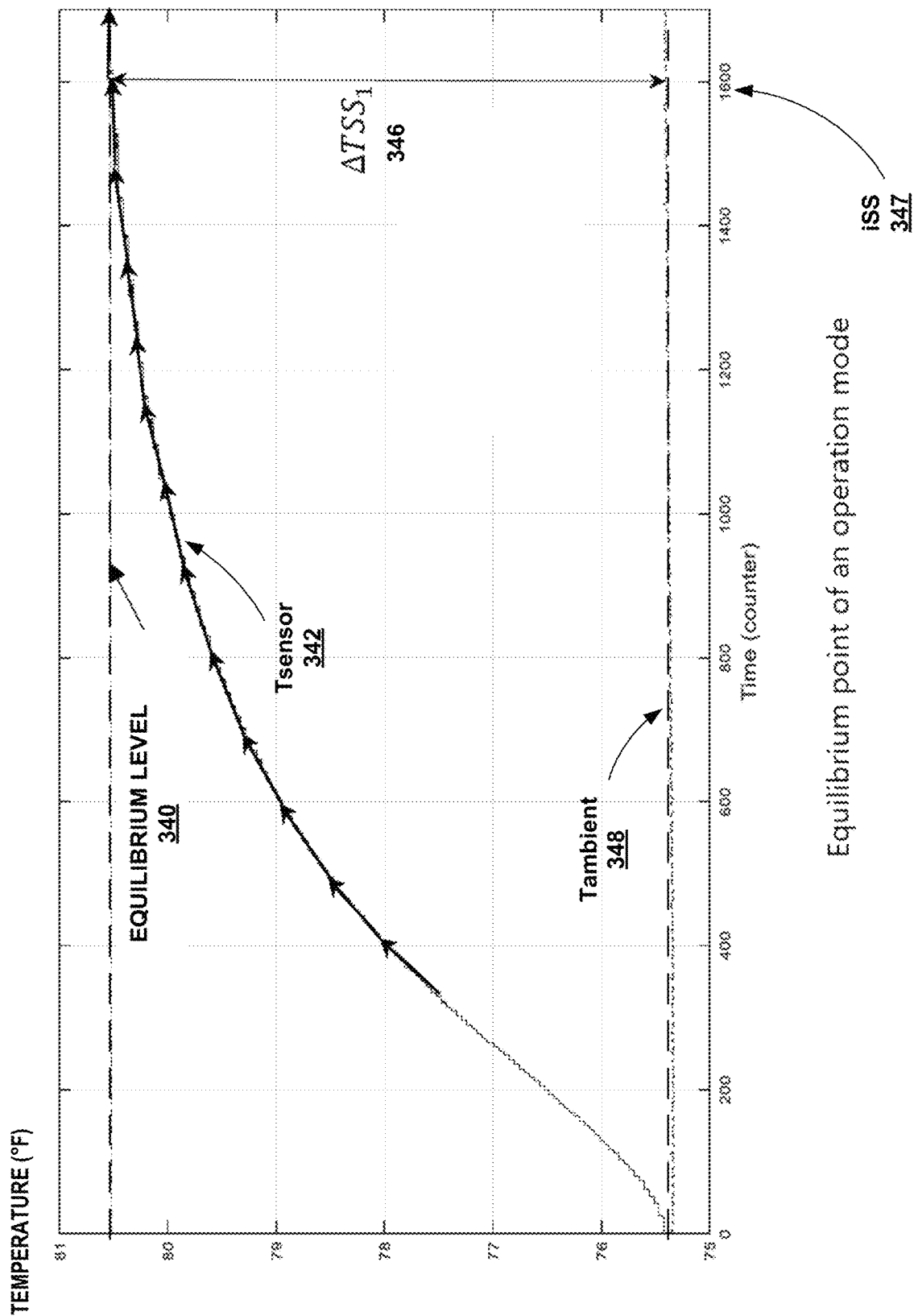
FIG. 6 is a time graph illustrating an equilibrium points relative to ambient temperature (Tamb) for a characteristic heating curve of this disclosure.

FIG. 6 is a time graph illustrating equilibrium points relative to ambient temperature (Tamb or Tambient) for a characteristic heating curve of this disclosure. The temperature measurement for Tsensor 342 increases with respect to Tambient 348, for example, when a thermostat, such as thermostat 102 described above in relation to FIG. 1, is plugged in, i.e. has power applied. The curve for Tsensor 342 may also increase with respect to Tambient 348 when the operating mode, as shown in Table 2—Reduced Operation Modes, changes to a higher power operating mode, e.g. from OM1 to OM3.

The change in temperature eventually reaches an equilibrium level 340, in which the change in temperature is approximately constant, within some small range of variability $\Delta T_{SS}$. In the example of FIG. 6, the temperature reaches a steady state level of $\Delta T_{SS1}$ (346), e.g. for OM1, at a steady state time, or steady state counter, of iSS 347.

Figure 7:
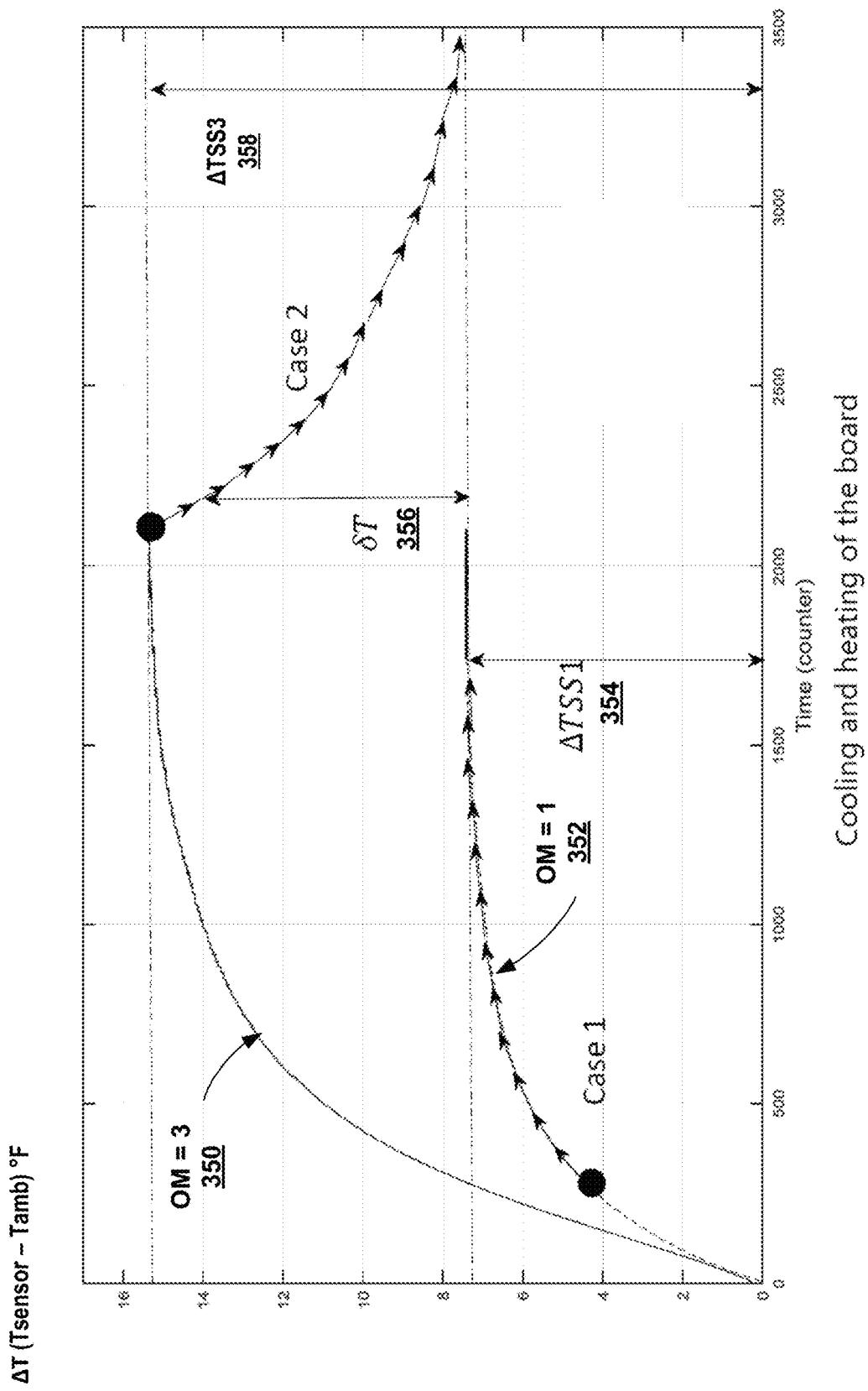
FIG. 7 is a time graph illustrating a characteristic heating curve for an example board heating and board cooling operation according to one or more techniques of this disclosure.

FIG. 7 is a time graph illustrating a characteristic curve for an example board heating and board cooling operation according to one or more techniques of this disclosure. Case 1 shows the board, e.g. the circuit board of thermostat 102 described above in relation to FIG. 1, increasing temperature to a steady state value $\Delta T_{SS1}$ 354 for OM=1 352 after applying power to the thermostat.

The board of the thermostat may not always be heated when the operational mode changes. As shown in FIG. 7, when an operation mode change occurs and the dynamic factor $\Delta T$ is above the equilibrium point of the new operation mode, then the board may be cooled. The expression for compensation for board cooling becomes:

$$T_{comp} = T_{sensor} - \delta T - \Delta T_{SS}$$

where $\Delta T_{SS}$ is the value of the equilibrium point of the current operation mode and the value of Tsensor is the point of the curve at certain time and $\delta T$ is the dynamic factor for cooling.

Case 2 shows the board cooling as the operating mode switches from OM=3 350 and reaches a steady state temperature difference from ambient of $\Delta T_{SS3}$ 358 to OM=1 352. The dynamic factor $\delta T$ 356 follows the curve of case 2 as the time, measured by the counter, increases. Eventually the board temperature cools to a steady state for OM=1 352 of $\Delta T_{SS1}$ 354. The techniques of this disclosure determine dynamic factor $\delta T$ 356 at a point in time along the curve in Case 2. As with the dynamic factor for heating $\Delta T$ described above in relation to FIG. 3, determining dynamic factor $\delta T$ 356 at a point in time is based on factors such as the time the operating mode changes, how much time has elapsed since the change in operating mode, the shape of the cooling curve, the starting operating mode and the ending operating mode. After the board reaches a steady state, dynamic factor $\delta T$ 356, or $\Delta T$, may be considered $\Delta T_{SSN}$, where N is the operating mode.

Figure 8A:
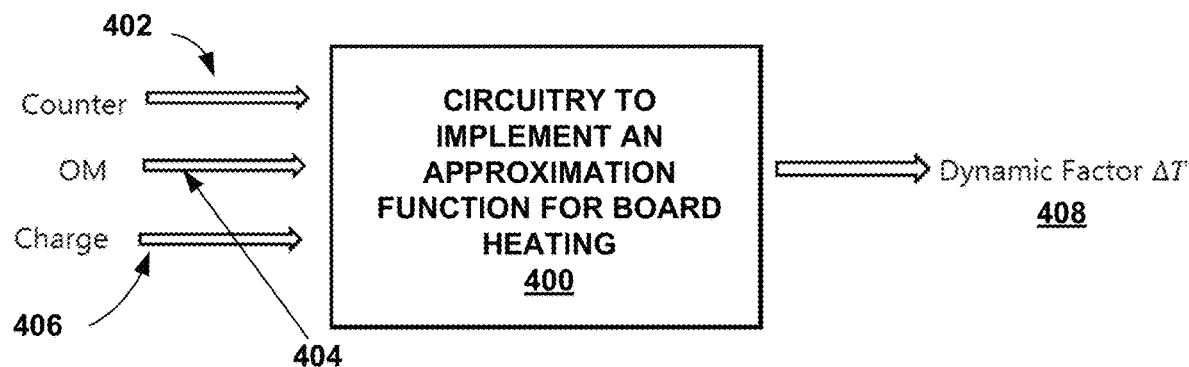
FIGS. 8A and 8B are a block diagrams illustrating an example approximation function to determine a dynamic factor for an evaporative cooling system according to one or more techniques of this disclosure.
Figure 8B:
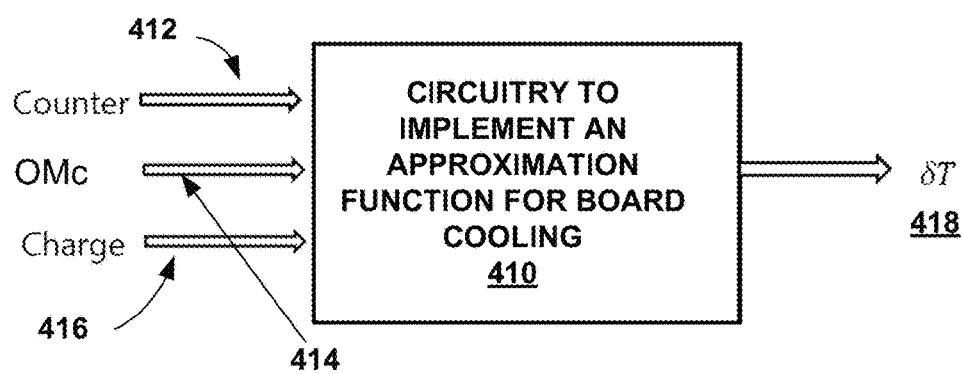

FIGS. 8A and 8B are a block diagrams illustrating an example approximation function to determine a dynamic factor for an evaporative cooling system according to one or more techniques of this disclosure. In some examples, functions 400 and 410 of FIGS. 8A and 8B may be implemented as neural network functions.

In the example of FIG. 8A, the approximation function for board heating 400, outputs dynamic factor $\Delta T$ 408. As described above in relation to FIGS. 1, 3, 5 and 7, the heating dynamic factor $\Delta T$ 408 travels along a curve until the value reaches a steady state temperature, such as the curve of Case 1 described above in relation to FIG. 7. Therefore, dynamic factor ΔT 408 depends on the operating mode, OM 404, the time as measured by counter 402 and the charge 406. In some examples, approximation function for board heating 400 may be implemented, for example by processing circuitry 104 executing instructions stored at memory 105, as described above in relation to FIG. 1. In other examples, a thermostat of this disclosure may include dedicated circuitry to implement the approximation function for board heating, 400.

Similarly, in the example of FIG. 8B, the approximation function for board cooling 410, outputs cooling dynamic factor δT 418. As with the heating dynamic factor ΔT 408 described above, the cooling dynamic factor δT 418 travels along a curve until the value reaches a steady state temperature, for example the curve of Case 2 described above in relation to FIG. 7. Therefore, dynamic factor δT 418 depends on the operating mode when cooling, OMc 414, the time as measured by counter 412 and the charge 416. For the same evaporative cooler system, charge 406 may be the same as charge 416 because the blower motor is the same.

Figure 9A:
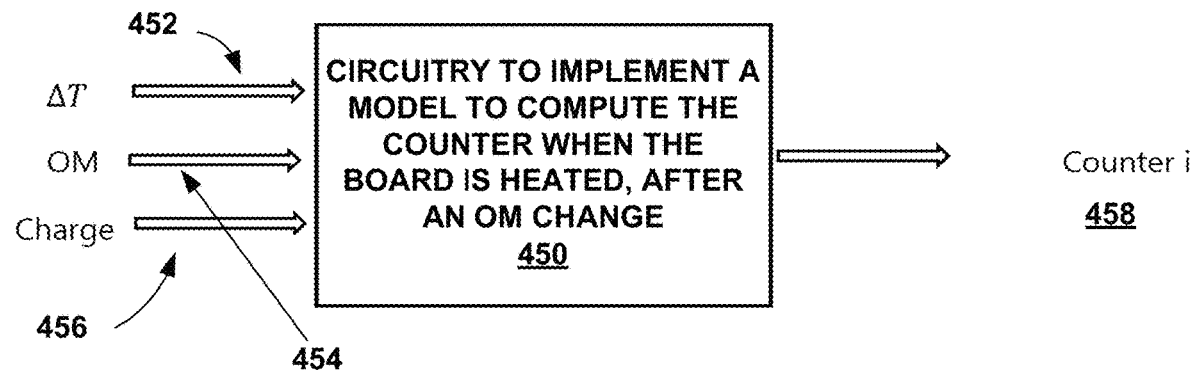
FIGS. 9A and 9B are a block diagrams illustrating an example modeling function to determine a start time for an operational mode change in an evaporative cooling system according to one or more techniques of this disclosure.
Figure 9B:
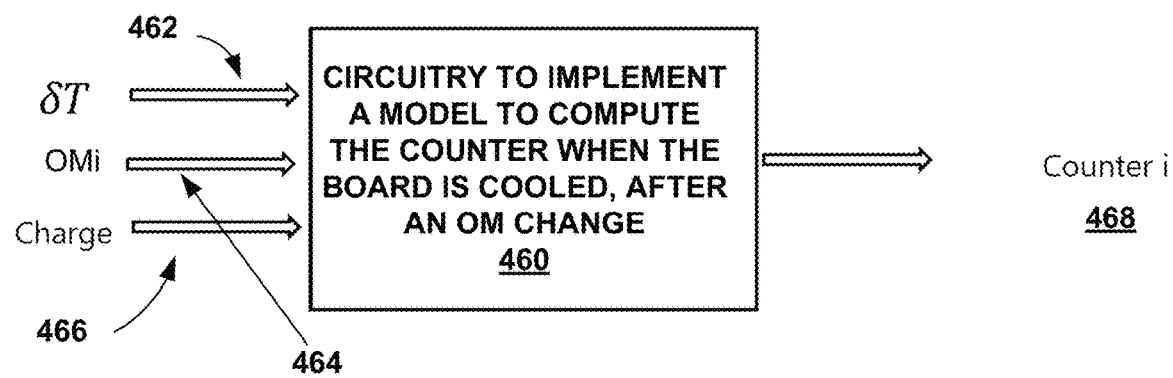

FIGS. 9A and 9B are a block diagrams illustrating an example modeling function to determine a start time for an operational mode change in an evaporative cooling system according to one or more techniques of this disclosure. The data used to construct models 450 and 460 depicted in FIGS. 9A and 9B can be the same data used for the dynamic factors models described above in relation to FIGS. 8A and 8B. In some examples, models 450 and 460 may be implemented with neural networks.

When an operating mode changes, for example, from powered off to OM=1 352 depicted in FIG. 7, the heating dynamic factor ΔT may "travel" along the characteristic heating curve for Case 1 (OM=1 352). In examples in which the thermostat is powered ON and a user (or programmed timer) changes the operating mode, the starting point of the curve must be defined. In other words, an OM change has occurred, and a new curve may begin a new trajectory at a specified starting time or counter value. As with the approximation function for board heating, 400, the functions described in relation to FIGS. 8A-9B may be implemented by processing circuitry, such as processing circuitry 104, or by dedicated circuitry for each function The model to compute the counter when the board is heated after an operating mode change 450, depicted in FIG. 9A, is configured to output a counter value (i) 458 based on receiving the value of the heating dynamic factor ΔT 452, OM 454 and the charge level 456. Similarly, the model to compute the counter when the board is cooled after an operating mode change 460, depicted in FIG. 9A, is configured to output a counter value (i) 468 based on receiving the value of the cooling dynamic factor δT 462, OM 464 and the charge level 466.

Figure 10:
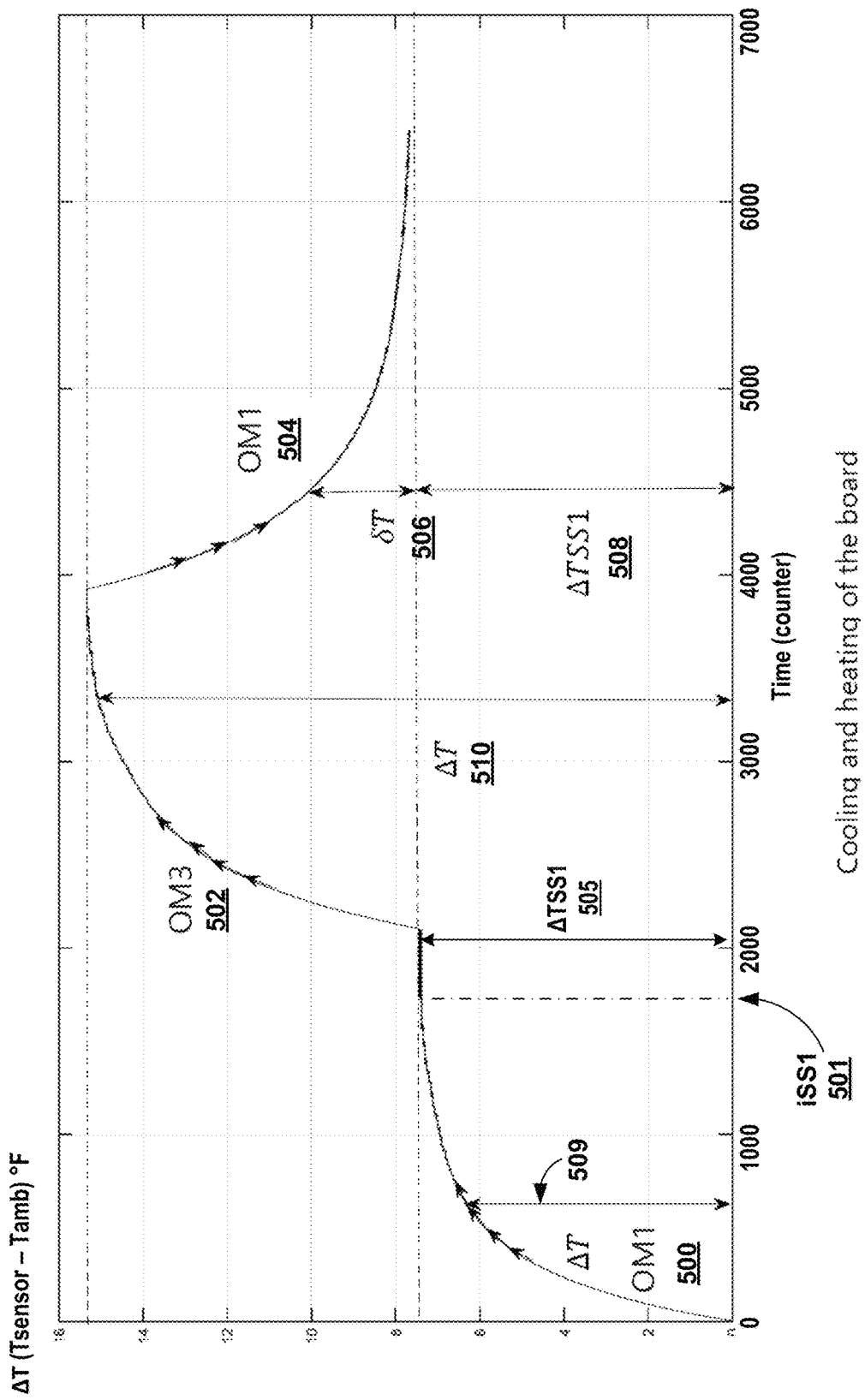
FIG. 10 is a time graph illustrating characteristic heating and cooling curves for an example operational mode change operation according to one or more techniques of this disclosure.

FIG. 10 is a time graph illustrating characteristic heating and cooling curves for an example operational mode change operation according to one or more techniques of this disclosure. The example of FIG. 10 will be used to explain in more detail the overall thermostat algorithm for an OM change as well as the approximation functions 400 and 410 described above in relation to FIGS. 8A and 8B and models 450 and 460 described above in relation to FIGS. 9A and 9B.

In the example of FIG. 10, charge is assumed constant and the operating modes changed at selected times. As described above in relation to FIG. 1, the operating mode may change based on a user input to the thermostat user interface, or change automatically at selected times programmed by the user. For example, the thermostat may be programmed to increase operating mode from OM1 to OM3 after sunrise and to change from OM3 to OM2 when the day cools in the afternoon or evening. The dynamic factors of ΔT and ST are function of the selected operating mode and counter, which measures time.

At time zero, OM1 500 starts when the thermostat is plugged in (e.g. power is applied). The heating dynamic factor ΔT 509 during OM1 500 travels along the OM1 heating characteristic curve as the counter increases (i.e. time increases). The approximation function for board heating 400, described above in relation to FIG. 8A, may be used to determine dynamic factor ΔT 509 at any point along the curve. In the example of FIG. 10, the thermostat remains set to OM1 500 for long enough for ΔT 509 to reach steady state, e.g. $\Delta T_{SS1}$ 505 when the counter exceeds the steady state counter value for OM1, iSS1 501.

The thermostat operating mode is set to OM3 (High cool) and the heating dynamic factor for OM3, ΔT 510, follows the heating characteristic curve for OM3 502. As with dynamic factor ΔT 509 for OM1, dynamic factor ΔT 510 may be determined at any counter value along the heating characteristic curve for OM3 502 by using approximation function for board heating 400, described above in relation to FIG. 8A.

Finally, the operating mode for High cool is changed the OFF condition OM1, described above in Table 2—Reduced Operation Modes. The cooling dynamic factor δT 506 follows the cooling characteristic curve for OM3 to OM1 504 (depicted as OM1 504). The approximation function for board cooling 410, described above in relation to FIG. 8B, may be used to determine dynamic factor δT 506 at any point along the curve.

Figure 11:
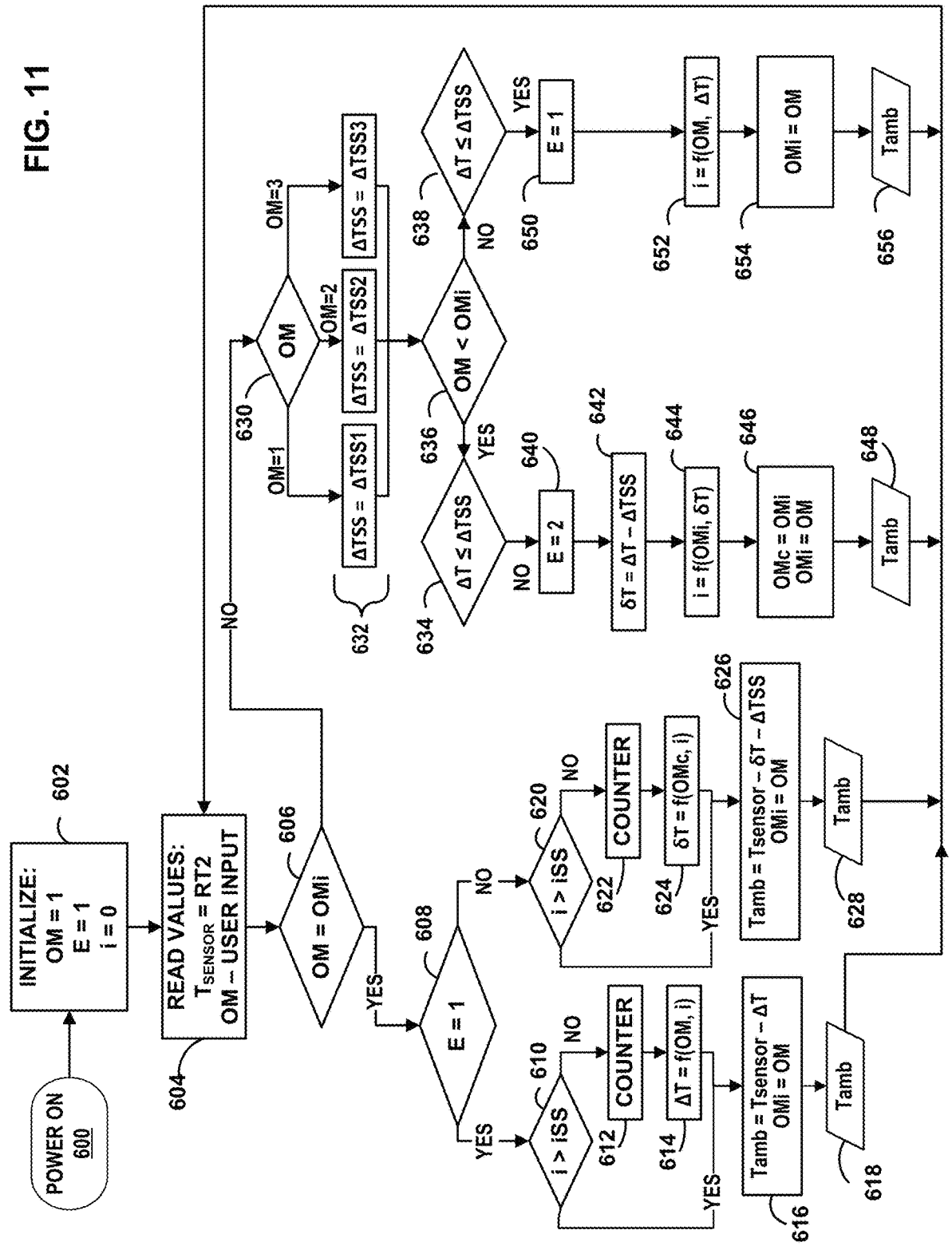
FIG. 11 is a flowchart illustrating an example operation of the evaporative cooling system during an operational mode change operation according to one or more techniques of this disclosure.

FIG. 11 is a flowchart illustrating an example operation of the evaporative cooling system during an operational mode change operation according to one or more techniques of this disclosure. The blocks of FIG. 11 will be described in terms of the time graph illustrated in FIG. 10 and assume that the charge level is fixed, e.g. the power rating for the blower motor does not change.

When power is applied to the thermostat (600), the thermostat may initialize by setting OM=1, E=1 (heating) and the counter to zero (i=0) (602). Power ON 600 corresponds to i=0 depicted in FIG. 10 and the temperature of the board inside the thermostat case begins to increase over the ambient temperature of the room as current begins to flow through the thermostat, as described above in relation to FIG. 1.

Processing circuitry of the thermostat may read the cool sensor value (TSENSOR=RT2) and check the user interface for the selected operating mode (604). Following the example as ΔT 509 increases for OM1 500 in FIG. 10, the decision block 606 compares initial operation mode OMi=1 to the actual operation mode OM. As the counter increments between 0 and 2000 in the example of FIG. 10, OM=1, therefore the comparison of OMi to OM indicates no change in operation mode (YES branch of 606).

Because the thermostat was just powered on, the temperature of the board may be increasing, therefore E=1 (YES branch of block 608).

In the example in which the thermostat is not yet at steady state for OM1, the counter i may be less than the steady state counter value for OM1, therefore i<iSS (NO branch of 610). The processing circuitry may increment the counter (612) and determine the heating dynamic factor as a function of the operating mode and the elapsed time, e.g. ΔT=f(OM, i) (614). Block 614 is an example of the approximation function for board heating 400, described above in relation to FIG. 8A. The value for charge is assumed constant in the example of FIG. 11.

In the example in which the board temperature of the thermostat has reached steady state for OM1, e.g. $\Delta T_{SS1}$ 505 depicted in FIG. 10, then i>iSS (YES branch of 610). After steady state, the dynamic factor is set to the steady state temperature difference for OM1, i.e. $\Delta T=\Delta T_{SS1}$.

Once the processing circuitry has determined the dynamic factor, $\Delta T$, the processing circuitry may estimate the ambient room temperature for the room in which the thermostat is placed and set the initial operating mode equal to the actual operating mode (616). That is, the processing circuitry estimates Tamb=Tsensor−$\Delta T$, and may display the ambient temperature on the user interface and determine whether or not the operating mode should change based on a comparison of Tamb to a temperature setpoint. As described above in relation to FIG. 1, the temperature setpoint may be entered at the user interface by the user or may be automatically changed according to a programmed schedule stored in the memory of the thermostat.

The next cycle continues at block 604 where the processing circuitry may read the sensor temperature and check the operating mode. As the counter increases, dynamic factor $\Delta T$ continues to track along the characteristic heating curve and eventually remains constant at $\Delta T_{SS1}$ 505.

In the example of FIG. 10, when the counter increases past 2000, the operating mode is changed from OM1 to OM3 502. Therefore, the output of block 606 OMi=OM indicates an operating mode change (NO branch of 606).

The processing circuitry assigns the steady state temperature value $\Delta T_{SS}$ for the equilibrium point of OM=3 to $\Delta T_{SS3}$ (OM=3 branch of 630). In other examples, the operating mode may change to OM2 and the processing circuitry may set the steady state temperature value $\Delta T_{SS}$ to $\Delta T_{SS2}$ (OM=2 branch of 630).

The processing circuitry determines whether the actual operating mode (OM) is less than the initial operating mode (OMi) (636). In the example of FIG. 10 between counter i=2000 and i=4000, OM=3 is not less than OMi=1 (NO branch of 636).

The processing circuitry may compare the current value of the dynamic factor $\Delta T$ to the steady state for OM3. Near i=2000 of FIG. 10, the dynamic factor $\Delta T$ is approximately $\Delta T_{SS1}$, which is less than the set value of $\Delta T_{SS}$, which is $\Delta T_{SS3}$ as described above for block 630 (YES of block 638). Therefore, the board temperature typically increases when switched to OM3 as compared to the temperature at OM1, causing the temperature of the board to transition towards the $\Delta T_{SS3}$, and E=1 (650).

Processing circuitry computes the value of the counter, i, to begin the characteristic curve of OM3 as a function of OM and $\Delta T$, e.g. i=f(OM, $\Delta T$) (652). Block 652 is an example of the model to compute the counter when the board is heated after an operating mode change 450, depicted in FIG. 9A. The value for charge is assumed constant. Processing circuitry may set the initial operating mode equal to the actual operating mode (654) and display the previously estimated ambient room temperature (656) for the room in which the thermostat is placed. The previously estimated ambient temperature is the temperature estimated when block 606 previously determined in an earlier cycle that there was no operating mode change (YES branch of 606).

The processing circuitry continues to execute the algorithm on each cycle by reading the temperature sensor and checking for changes in operating mode (604). As the board temperature increases along the OM3 502 curve depicted in FIG. 10, the processing circuitry determines that there is no change to the operating mode (YES branch of 606) and that the board continues to heat (YES branch of 608), as described above for the dynamic factor computation for OM1, but OM3 is used to estimate the dynamic factor in block 614.

In the example of FIG. 10, when the counter is at approximately 4000, the processing circuitry determines that the operating mode has changed to OM1 (motor and pump is OFF, as described above in relation to Table 2). The processing circuitry compares the new actual operating mode (OM=1) to the previous operating mode (OMi=3). The OM values are not equal (NO branch of 606), and the processing circuitry assigns the new expected steady state temperate difference as $\Delta T=\Delta T_{SS1}$ (OM=1 branch of 630). At block 636, the processing circuitry compares the actual OM to the previous OM and determines that OM=1 is less than OM=3 (YES branch of 636), i.e. OM<OMi.

At block 634, the most recently computed heating dynamic factor $\Delta T$ is compared against the steady state equilibrium point. In the example of FIG. 10 at approximately i=4000, the dynamic factor $\Delta T$ is larger than the newly assigned steady state value of $\Delta T_{SS1}$, (NO of 634) so the board may be cooled and E=2 (640).

The processing circuitry determines the cooling dynamic factor as $\delta T=\Delta T-\Delta T_{SS1}$ (642) and uses the cooling dynamic factor $\delta T$ to determine the counter, i, for cooling (644). Block 644 is an example of model to compute the counter when the board is cooled after an operating mode change 460, depicted in FIG. 9B. The processing circuitry assigns OMc=OMi and sets the value of OMi to be the current, actual operating mode (646). The processing circuitry displays the previously estimated Tamb (648) as described above and may display Tamb on the user interface of the thermostat.

The processing circuitry continues executing the algorithm on subsequent cycles by reading the value of Tsensor and checking for updates to the operating mode (604).

As the counter increments between 4000 and 6000 in the example of FIG. 10, OM1 is kept activated. The processing circuitry may therefore determine that OM is equal to OMi, i.e. no change in operating mode (YES branch of 606).

The processing circuitry checks for heating or cooling, and because E=2, as set in block 640, the processing circuitry may determine the board continues to cool along the characteristic curve of OM3 to OM1 504 depicted in FIG. 10 (NO branch of 608). While transitioning along the cooling OM3 curve 504, the previous operating mode is OM3 (OMi=3) and the currently selected OM, aka actual OM, is OM1 (OM=1). Similar to block 610 described above, the processing circuitry checks whether the counter has exceeded the steady state counter value for the OM3 to OM1 transition. When the counter is less than 6000, as shown in FIG. 10, the processing circuitry determines that the counter is less than the steady state counter value (NO branch of 620). The processing circuitry may increment the counter (622) and determine the cooling dynamic factor as a function of OMc and the elapsed time, i.e. $\delta T=f(OMc, i)$ (624). Block 624 is an example of the approximation function for board cooling 410, described above in relation to FIG. 8B. The value of OMc was set at block 646 in a previous algorithm cycle. When enough time has passed that the temperature of the board is in steady state (YES branch of 620), then the cooling dynamic factor $\delta T$ decreases to a value near zero.

With the computed value of δT, the processing circuitry sets OMi=OM and estimates the ambient temperature (626) according to:

$$T_{amb} = T_{sensor} - \delta T - \Delta T_{SS}$$

and may display the ambient temperature as well as compare the ambient temperature to a temperature setpoint (628).

In some examples, when the newly selected operating mode (OM) is a lower current mode than the previous operating mode (OMi), i.e. OM<OMi, the board may cool (e.g. E=2) as the temperature transitions toward steady state, as shown in Case 2 depicted in FIG. 10. In Case 2, at the point in time (counter at about 3900) at which OM=3 is switch to OM=1, the value of dynamic factor ΔT 510 is greater than the equilibrium point for OM=1 (e.g. $\Delta T_{SS1}$ 505), so the board cools. However, this may not always be the case. For example, if the value of dynamic factor ΔT, e.g. ΔT 509 is less than the equilibrium point for OM=1 (e.g. ΔT 509<$\Delta T_{SS1}$ 505), at the point at which OM=3 is switched to OM=1, then the board may heat (E=1). This circumstance may occur when the operating mode is switched from OM=3 to OM=1 when the counter is below an initial counter value, e.g. soon after power is applied to the thermostat but before the board heats up past $\Delta T_{SS1}$ 505 (not shown in FIG. 10).

Figure 12:
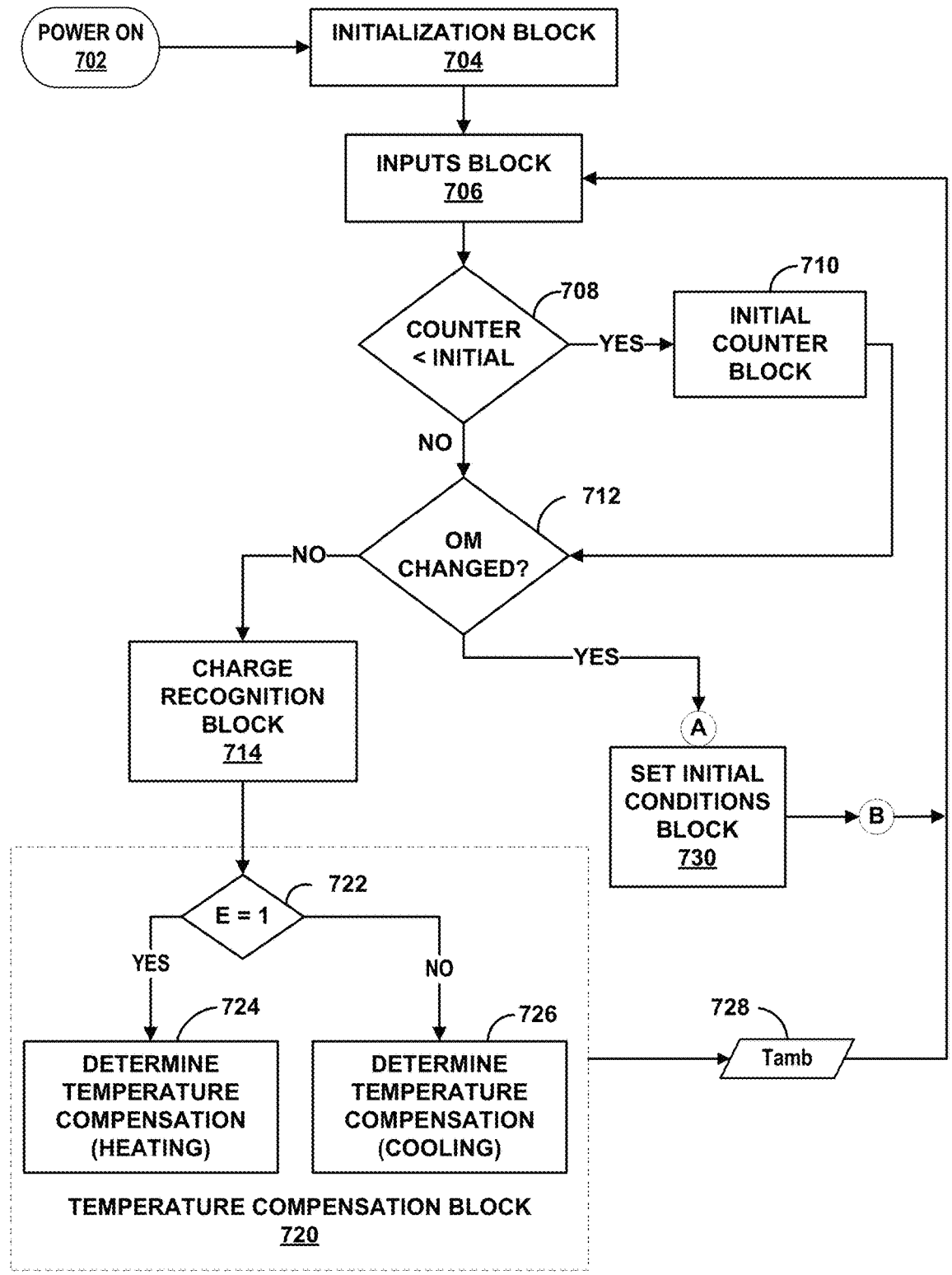
FIG. 12 is a flowchart illustrating an example ambient temperature estimation algorithm for the evaporative cooling system of this disclosure.

FIG. 12 is a flowchart illustrating an example ambient temperature estimation algorithm for the evaporative cooling system of this disclosure, such as system 100 described above in relation to FIG. 1A. The flow chart of FIG. 12 provides an overview of the algorithm executed by the processing circuitry of the thermostat of this disclosure. The blocks of FIG. 12 may include the functions described above in relation to FIG. 11, as well as additional functions and steps not shown to simplify the description.

When a line voltage thermostat, such as thermostat 102 described above in relation to FIG. 1A, is powered on (702), the processing circuitry for the thermostat may execute an initialization block (704). Some steps of initialization block 704 may include steps of initialization block 602, described above in relation to FIG. 11. For example, the processing circuitry may set the initial operating mode to OM1, assume the circuit board will be heating instead of cooling (E=1) and set the counter to zero (i=0). Initialization block 704 may also include additional initialization steps.

Whenever there is an electric power interruption, and the power is recovered, e.g. power ON 702, the thermostat may start up and initialize to the OFF condition (OM1), as described above and shown in Table 2. If the interruption has been just some a short period, such as a few minutes long, the internal temperatures of the thermostat may still be high. Therefore, in some examples, the processing circuitry may execute instructions to leave the thermostat for a specified period, for example, three minutes, five minutes, or some similar period, every time that the thermostat is plugged in (e.g. power ON). The specified period may allow the processing circuitry to determine whether the thermostat is initially hot internally and the processing circuitry may compensate the temperature accordingly.

After initialization, the processing circuitry may receive inputs from the one or more temperatures sensors, such as sensors RT1 130 and RT2 132 described above in relation to FIG. 1A (706). The processing circuitry may receive inputs from the user interface, such as operating mode, temperature setpoint, schedule programming and other inputs. Inputs block 706 is an example of block 604 described above in relation to FIG. 11.

In the example of FIG. 12, the processing circuitry may check whether the counter less than an initial value (708).

The processing circuitry may execute certain initial counter functions (710) when the counter has a low initial value (YES branch of 708). For example, the processing circuitry may execute the power interruption functions described above, functions related to the board warming up for the first time, or similar functions.

After initial counter block 710, or when the counter is greater than an initial value (NO branch of 708), the processing circuitry may compare the actual operating mode, e.g. selected by the user, to the initial operating mode (OMi) to determine whether the operating mode has changed (712). When the operating mode has changed (YES branch of 712) the processing circuitry may set some initial conditions for the new operating mode (730). Some examples of initial conditions may include setting the expected steady state temperature, $\Delta T_{SS}$ and calculating the counter as described above in relation to FIG. 11. After setting the initial conditions, the processing circuitry starts a new cycle by checking the inputs block 706 as described above.

In the example in which there is no change to the operating mode (NO branch of 712), the processing circuitry may execute charge recognition block 714. As described above in relation to FIG. 5, the difference between the temperatures sensed by the cool and hot thermistors increases with the charge. This temperature difference is stable and unique for each charge/load when the characteristic curves have arrived at steady state for a selected operating mode.

In the example of FIG. 12, The charge recognition is performed for OM2 and the OM3. In OM1, as described above in relation to Table 2, the blower motor and pump are not receiving current. When the counter has a value greater than the initial value described above in relation to block 708 and greater than iSS 347 depicted in FIG. 6, the circuit board of the thermostat is considered to have reached a steady state. Once at a steady state, then the processing circuitry may perform a charge recognition. The processing circuitry may determine the variable ΔT_ch according to:

$$\Delta T\text{ch} = T\text{hot sensor} - T\text{cool sensor}$$

The calculated value of ΔT_ch is introduced to the models for heating and cooling, described above in relation to FIGS. 8A, 8B, 9A and 9B to compute the cooling and heating dynamic factors and the cooling and heating counters.

Charge recognition block 714 was omitted from FIG. 11 to simplify the explanation of the algorithm in FIG. 11. However, the functions of charge recognition block 714 may be included in the example of FIG. 11. Charge recognition block 714 may provide the benefit of using a single model of thermostat to control a variety of evaporative cooler for a variety of buildings. The thermostat may determine the operational characteristics of each particular evaporative cooler without the need for extensive preprogramming and setup. In addition, the thermostat of this disclosure may determine the actual operational characteristics of a particular evaporative cooler, rather than the estimated operational characteristics based on a labeled rating or performance description.

Temperature compensation block 720 includes the models for heating and cooling described above in relation to FIGS. 8A-9B and 11. As with block 608 depicted in FIG. 11, the processing circuitry determines whether the board is expected to be heating or cooling (722). If heating, then E=1 (YES branch of 722) and the processing circuitry determines the temperature compensation according to the heating steps of the algorithm (724). For example, the processing circuitry may determine whether the board is at steady state, determine the heating dynamic factor, ΔT, and compensate the temperature measured by the cool sensor, e.g. sensor RT2 132 depicted in FIG. 1A to calculate the ambient temperature, Tambient, of the room in which the thermostat is placed.

If cooling (NO branch of 722), the processing circuitry determines the temperature compensation according to the cooling steps of the algorithm (726). For example, the processing circuitry may determine whether the board is at steady state, determine the cooling dynamic factor, δT, and compensate the temperature measured by the cool sensor to calculate the ambient temperature, Tambient, (728) as described above in relation to blocks 624 and 626 of FIG. 11. The processing circuitry then continues the next cycle of the algorithm by executing the inputs block 706.

Figure 13:
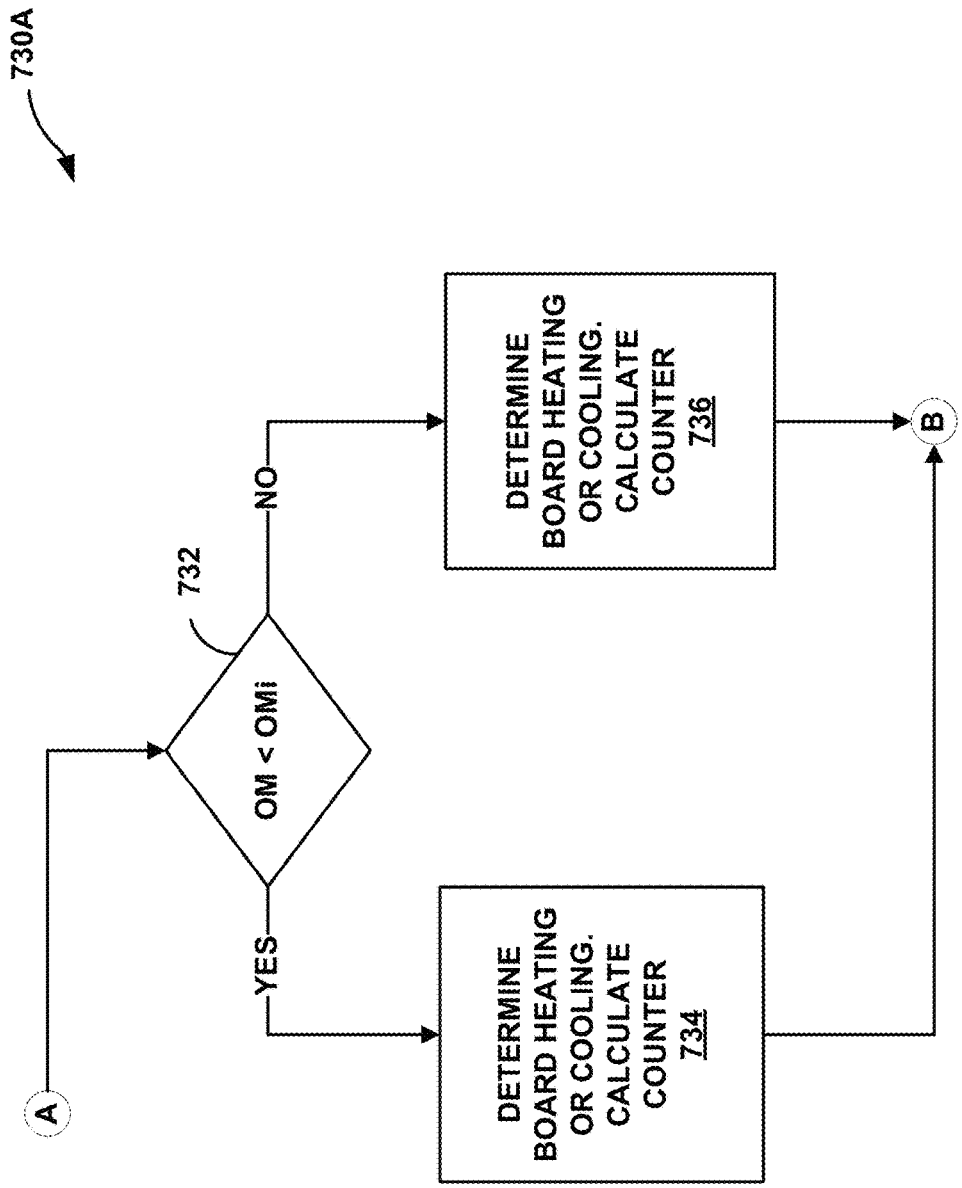
FIG. 13 is a flowchart illustrating additional details for the initial conditions block of the ambient temperature estimation algorithm for the evaporative cooling system of this disclosure.

FIG. 13 is a flowchart illustrating additional details for the initial conditions block of the ambient temperature estimation algorithm for the evaporative cooling system of this disclosure. The example of flowchart 730A is an example of the set initial conditions block 730 described above in relation to FIG. 12. The "A" and "B" in FIG. 13 correspond to the "A" and "B" depicted in FIG. 12.

The operating mode may change in a thermostat, such as thermostat 102 described above in relation to FIG. 1, based on user input to the thermostat, or in some examples, based on a preprogrammed schedule. For example, a thermostat may be preprogrammed to reduce cooling to LOW in the evening hours and to HIGH during the day. When the operating mode changes, the algorithm described above in relation to FIG. 12, may set various initial conditions based on the current operating mode compared to the new operating mode as well as whether the current operating mode is in steady state, e.g. reached the equilibrium point for that operating mode.

Each of blocks 734 and 736 may determine whether after an OM change the board will be heated (E=1) or cooled (E=2). As described above in relation to FIGS. 11 and 12, the processing circuitry compares the value of current dynamic factor ΔT against the value of the equilibrium point, e.g. $\Delta T_{SS}$, of the new operating mode. As described above in relation to FIGS. 11 and 12, the particular steps for blocks 734 and 736 may be different depending on whether the OM<OMi (YES branch of 732) or OM>OMi (NO branch of 732). In other words, whether the actual or newly selected operating mode (OM) is a higher current mode or lower current mode compared to the initial or previous operating mode (OMi).

Then the processing circuitry applies charge (ΔT_ch) calculated by charge recognition block 714 depicted in FIG. 12, to the actual OM when E=1, as shown in block 652 depicted in FIG. 11, and shown in FIG. 9A. When E=2 (board is cooling) the processing circuitry applies charge (ΔT_ch) to the initial or previous operating mode (OMi) as shown in block 644 depicted in FIG. 11 and shown in FIG. 9B. To assign the correct value for the charge, the processing circuitry first determines the operating mode, to introduce the correct input, so that the models will work with the correct curve, as described above in relation to FIGS. 5, 7, and 8A-9B.

In order to have a continuity of ΔT along the correct curve and therefore continuity in the compensation of temperature after an operating mode change, the set initial conditions block 730A may check several different combinations of circumstances to select the appropriate initial conditions, as described above in relation to FIGS. 11 and 12. For example, whether the counter has exceed a predetermined value to indicate steady state, the initial operating mode, the newly selected operating mode, power loss and recovery, and other similar circumstances. For example, switching from OM=1 to OM=3 may cause the processing circuitry to select different initial conditions than when switching from OM=1 to OM=2. The comparison against equilibrium points ($\Delta T_{SS}$) along with the operation modes may determine which set of circumstances to be used to compute initial conditions after an OM change. Some examples of initial conditions may include which characteristic curve to follow (e.g. based on E type, OM and charge) and at which part of the characteristic curve (e.g. based on the elapsed time as measured by the counter) to compute of the dynamic factor.

In one or more examples, the functions described above may be implemented in hardware, software, firmware, or any combination thereof. For example, the various components of FIGS. 1 and 8A-9B, such as processing circuitry 104 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, such as memory 105, may include random access memory (RAM), read only memory (ROM), programmable read only memory (PROM), erasable programmable read only memory (EPROM), electronically erasable programmable read only memory (EEPROM), flash memory, a hard disk, or other computer readable media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processing circuitry" or "processor," as used herein, may refer to any of the foregoing structure or any other structure suitable for implementation of the techniques described herein. In addition, in some aspects, the functionality described herein may be provided within dedicated hardware and/or software modules configured for encoding and decoding, Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A method comprising:
   determining a temperature inside a housing at a first time based on a signal from a sensor, wherein the housing is a housing for a thermostat, and
   determining an operating mode for the thermostat;
   determining a charge level of an external load controlled by the thermostat, wherein the charge level is based on power consumption of the external load;
   determining a dynamic factor based on:
      the determined temperature inside the housing,
      the operating mode, and
      the charge level; and
   applying the dynamic factor to the determined temperature inside the housing to determine an ambient temperature at the first time, wherein the ambient temperature is a temperature exterior to the housing.

2. The method of claim 1, wherein the external load comprises a water pump.

3. The method of claim 1, wherein the external load comprises one or more of a water pump, a motor, or a multi-speed motor.

4. The method of claim 3, wherein selecting the operating mode determines one or more of: an on-off setting for the water pump, a setting for the motor, or a speed for the multi-speed motor.

5. The method of claim 4, wherein the multi-speed motor is a two-speed motor.

6. The method of claim 4, further comprising:
   determining the dynamic factor based on whether the operating mode changes from a first operating mode to a second operating mode, wherein a first current through the thermostat during the first operating mode is less than a second current through the thermostat during the second operating mode.

7. The method of claim 6, further comprising:
   determining the dynamic factor based on whether the operating mode changes from the second operating mode to the first operating mode.

8. The method of claim 3,
   wherein the charge level is based on a magnitude of electrical current through the switch circuitry, and
   wherein the magnitude of electrical current is based on at least one or more of: the size of the multi-speed motor or the operating speed of the multi-speed motor during operation of the multi-speed motor.

9. The method of claim 8, wherein the sensor is a first sensor, the method further comprising determining the charge level based on a temperature difference between the first sensor and a second sensor.

10. The method of claim 1, further comprising:
    determining a first value for the dynamic factor at a first time and determining a second value for the dynamic factor at a second time different from the first time, wherein:
    during the second time the temperature inside the housing is at a steady state equilibrium temperature value for the operating mode, and
    during the first time the temperature inside the housing is transitioning toward the steady state equilibrium temperature value for the operating mode.

11. A device comprising:
    a housing;
    a first temperature sensor located within the housing;
    switch circuitry located within the housing and configured to control a load external to the device;
    processing circuitry located within the housing and configured to:
       receive signals from the first temperature sensor indicating a temperature within the housing;
       receive an indication of an operating mode for the device;
       determine a charge level of the external load controlled by the device,
    wherein the charge level is based on power consumption of the external load;
       determine a dynamic factor based on:
          the determined temperature inside the housing,
          the operating mode, and
          the charge level; and
       apply the dynamic factor to the determined temperature inside the housing to determine an ambient temperature, wherein the ambient temperature is a temperature exterior to the housing.

12. The device of claim 11,
    wherein the charge level is based on a magnitude of electrical current through the switch circuitry, and
    wherein the magnitude of electrical current is based on at least one or more of: the size of the external load or the operating speed of the external load.

13. The device of claim 11, wherein the external load comprises one or more of a water pump, a motor, or a multi-speed motor.

14. The device of claim 13, wherein the operating mode determines one or more of: an on-off setting for the water pump, a setting for the motor, or a speed for the multi-speed motor.

15. The device of claim 14, wherein the processing circuitry is further configured to determine the dynamic factor based on whether the operating mode changes from a first operating mode to a second operating mode, wherein a first current through the device during the first operating mode is less than a second current through the device during the second operating mode.

16. The device of claim 15, wherein the processing circuitry is further configured to determine the dynamic factor based on whether the operating mode changes from the second operating mode to the first operating mode.

17. The device of claim 13, wherein the charge level is based on power consumption by the multi-speed motor during operation of the multi-speed motor.

18. The device of claim 11, further comprising a second temperature sensor located within the housing,
    wherein the second temperature sensor is located closer to the switch circuitry than the first temperature sensor and, during operation of the external load, is subject to higher temperatures than the first temperature sensor, and wherein the processing circuitry is further configured to determine the charge level based on a temperature difference between the first temperature sensor and the second temperature sensor.

19. A system comprising:
an evaporative cooler device, comprising:
  a water pump; and
  a multi-speed blower motor; and
a thermostat device, the thermostat device comprising:
  a housing;
  a first temperature sensor located within the housing;
  switch circuitry located within the housing and configured to control the water pump and the multi-speed blower motor;
  processing circuitry located within the housing and configured to:
    receive signals from the first temperature sensor indicating a temperature within the housing;
    receive an indication of an operating mode for the device, wherein the operating mode determines a speed setting for the multi-speed blower motor and determines an on-off setting for the water pump;
    determine a charge level of an external load controlled by the thermostat, wherein the external load comprises the water pump and the blower motor and wherein the charge level is based on power consumption of the external load;
    determine a dynamic factor based on:
      the determined temperature inside the housing,
      the operating mode, and
      the charge level; and
    apply the dynamic factor to the determined temperature inside the housing to determine an ambient temperature, wherein the ambient temperature is a temperature exterior to the housing.

20. The system of claim 19, wherein the processing circuitry is further configured to determine the dynamic factor based on whether the operating mode changes from a first operating mode to a second operating mode, wherein a first current through the thermostat during the first operating mode is less than a second current through the thermostat during the second operating mode.

* * * * *